United States Patent
Masuda et al.

(10) Patent No.: US 7,890,620 B2
(45) Date of Patent: Feb. 15, 2011

(54) MONITORING SYSTEM AND MONITORING METHOD

(75) Inventors: Mineyoshi Masuda, Kunitachi (JP); Norihiro Kobayashi, Yokohama (JP); Tomohiro Morimura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 912 days.

(21) Appl. No.: 11/194,614

(22) Filed: Aug. 2, 2005

(65) Prior Publication Data
US 2006/0277295 A1 Dec. 7, 2006

(30) Foreign Application Priority Data
Jun. 3, 2005 (JP) .............................. 2005-164630

(51) Int. Cl.
G06F 15/173 (2006.01)
G06F 11/00 (2006.01)
H04L 12/26 (2006.01)
(52) U.S. Cl. .......................... 709/224; 370/252; 714/47
(58) Field of Classification Search ................. 709/224; 714/47; 370/252
See application file for complete search history.

(56) References Cited

U.S. PATENT DOCUMENTS

| | | | |
|---|---|---|---|
| 6,397,359 B1 * | 5/2002 | Chandra et al. | 714/712 |
| 6,625,648 B1 * | 9/2003 | Schwaller et al. | 709/224 |
| 6,681,232 B1 * | 1/2004 | Sistanizadeh et al. | 1/1 |
| 6,751,662 B1 * | 6/2004 | Natarajan et al. | 709/223 |
| 6,763,380 B1 * | 7/2004 | Mayton et al. | 709/224 |
| 6,801,940 B1 * | 10/2004 | Moran et al. | 709/224 |
| 7,051,098 B2 * | 5/2006 | Masters et al. | 709/224 |
| 7,216,263 B2 * | 5/2007 | Takaoka et al. | 714/47 |
| 7,246,156 B2 * | 7/2007 | Ginter et al. | 709/217 |
| 7,412,509 B2 * | 8/2008 | Murase et al. | 709/224 |
| 7,600,007 B1 * | 10/2009 | Lewis | 709/223 |

(Continued)

FOREIGN PATENT DOCUMENTS

JP 5-205074 1/1992

(Continued)

OTHER PUBLICATIONS

Japanese Office Action dated Nov. 4, 2008 regarding Japanese Patent Application No. 2005-164630, in Japanese.

*Primary Examiner* — William C Vaughn, Jr.
*Assistant Examiner* — Muktesh G Gupta
(74) *Attorney, Agent, or Firm* — Stites & Harbison, PLLC; Juan Carlos A. Marquez, Esq.

(57) ABSTRACT

The monitoring technology capable of reducing total monitoring cost without degrading the monitoring capability in accordance with the configuration of the large-scale service system and quickly comprehending the state of the service system after the configuration change. A monitoring system in which information processing apparatuses constituting the service system are objects to be monitored has a monitoring manager program and a plurality of monitoring agent programs, and objects to be monitored having the same performance characteristics are sorted into the same groups. In each of the groups, parties where monitoring is carried out at a short monitoring interval and parties where the monitoring is carried out at a long monitoring interval are provided. The performance of objects to be monitored in the party of the long monitoring interval is estimated from the performance of the objects to be monitored in the party of the short monitoring interval.

17 Claims, 38 Drawing Sheets

U.S. PATENT DOCUMENTS

| | | |
|---|---|---|
| 7,685,269 B1 * | 3/2010 | Thrasher et al. .............. 709/224 |
| 7,742,436 B2 * | 6/2010 | Carrillo et al. ............... 370/255 |
| 7,779,119 B2 * | 8/2010 | Ginter et al. ................ 709/224 |
| 2003/0149761 A1 * | 8/2003 | Baldwin et al. ............. 709/224 |
| 2004/0042470 A1 * | 3/2004 | Cooper et al. ............... 370/401 |
| 2004/0088386 A1 * | 5/2004 | Aggarwal .................... 709/220 |
| 2005/0132041 A1 * | 6/2005 | Kundu ........................ 709/224 |
| 2005/0216585 A1 * | 9/2005 | Todorova et al. ............ 709/224 |
| 2006/0064486 A1 * | 3/2006 | Baron et al. ................. 709/224 |
| 2006/0112175 A1 * | 5/2006 | Sellers et al. ............... 709/223 |
| 2008/0201468 A1 * | 8/2008 | Titus .......................... 709/224 |

FOREIGN PATENT DOCUMENTS

| | | |
|---|---|---|
| JP | 7-152706 | 11/1993 |
| JP | 8-275260 | 3/1995 |
| JP | 2000-92091 | 9/1998 |
| JP | 2001-282554 | 3/2000 |
| JP | 2003-271471 | 3/2002 |
| JP | 2004-178118 | 11/2002 |

* cited by examiner

| PARTY | MONITORING AGENT PROGRAM | MONITORING INTERVAL |
|---|---|---|
| FIRST PARTY | MONITORING AGENT PROGRAM 1 | 60 sec. |
| | MONITORING AGENT PROGRAM 2 | 60 sec. |
| SECOND PARTY | MONITORING AGENT PROGRAM 3 | 300 sec. |
| | ⋮ | ⋮ |
| | MONITORING AGENT PROGRAM N | 300 sec. |

| PARTY | MONITORING INTERVAL | MONITORING AGENT PROGRAM |
|---|---|---|
| FIRST PARTY | 60 sec. | MONITORING AGENT PROGRAM 1 |
| | | MONITORING AGENT PROGRAM 2 |
| SECOND PARTY | 300 sec. | MONITORING AGENT PROGRAM 3 |
| | | ⋮ |
| | | MONITORING AGENT PROGRAM N |

FIG. 7

| PARTY | MONITORING AGENT PROGRAM | MONITORING INTENSITY |
|---|---|---|
| FIRST PARTY | MONITORING AGENT PROGRAM 1 | INTENSITY 3 |
| | MONITORING AGENT PROGRAM 2 | INTENSITY 3 |
| SECOND PARTY | MONITORING AGENT PROGRAM 3 | INTENSITY 10 |
| | ⋮ | ⋮ |
| | MONITORING AGENT PROGRAM N | INTENSITY 10 |

| PARTY | MONITORING INTENSITY | MONITORING AGENT PROGRAM |
|---|---|---|
| FIRST PARTY | INTENSITY 3 | MONITORING AGENT PROGRAM 1 |
| | | MONITORING AGENT PROGRAM 2 |
| SECOND PARTY | INTENSITY 10 | MONITORING AGENT PROGRAM 3 |
| | | ⋮ |
| | | MONITORING AGENT PROGRAM N |

FIG. 9

| MONITORING INTENSITY | MONITORING INTERVAL |
|---|---|
| INTENSITY 1 | 10 sec. |
| INTENSITY 2 | 30 sec. |
| INTENSITY 3 | 60 sec. |
| ⋮ | ⋮ |
| INTENSITY 10 | 300 sec. |
| ⋮ | ⋮ |
| INTENSITY 20 | 900 sec. |

0104

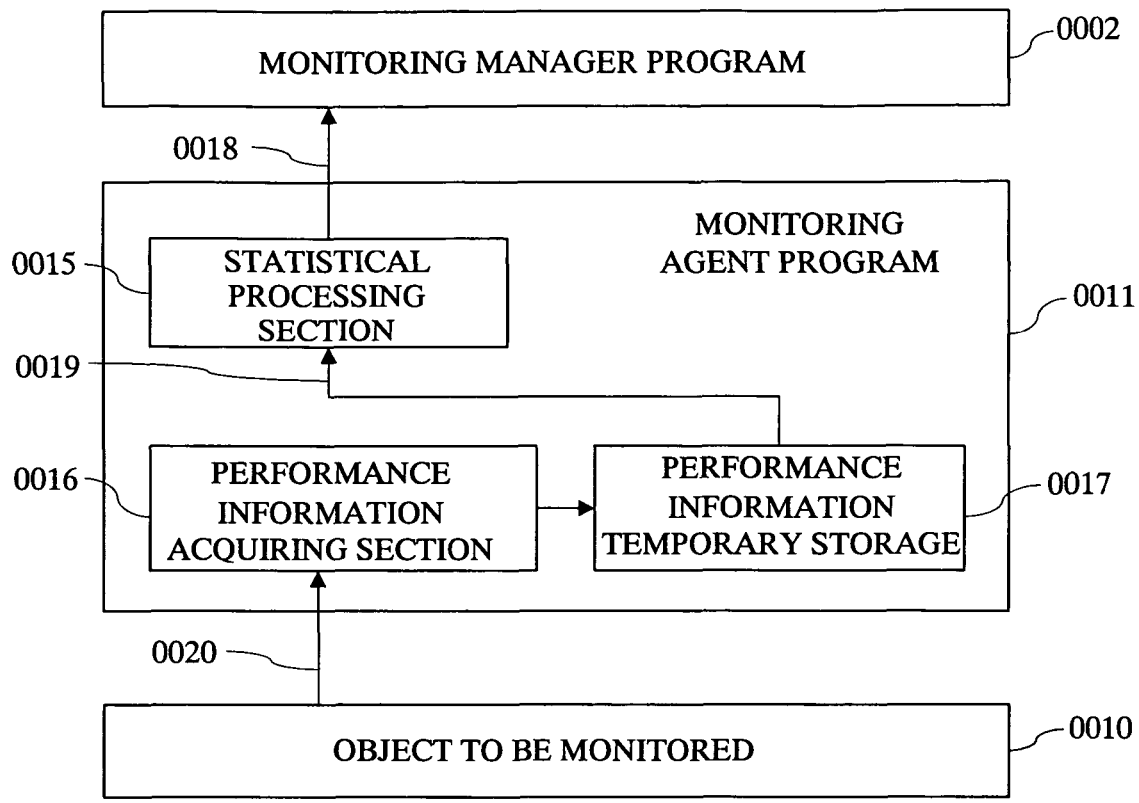

| PARTY | MONITORING INTERVAL | LOAD AMOUNT | MONITORING AGENT PROGRAM |
|---|---|---|---|
| FIRST PARTY | 60 sec. | 15 | MONITORING AGENT PROGRAM 1 |
| | | | MONITORING AGENT PROGRAM 2 |
| SECOND PARTY | 300 sec. | 20 | MONITORING AGENT PROGRAM 3 |
| | | | ⋮ |
| | | | MONITORING AGENT PROGRAM N |

| PARTY | MONITORING INTERVAL | LOAD AMOUNT | MONITORING AGENT PROGRAM |
|---|---|---|---|
| FIRST PARTY | 60 sec. | 20 | MONITORING AGENT PROGRAM 1 |
| | | | MONITORING AGENT PROGRAM 2 |
| SECOND PARTY | 300 sec. | 15 | MONITORING AGENT PROGRAM 3 |
| | | | ⋮ |
| | | | MONITORING AGENT PROGRAM N |

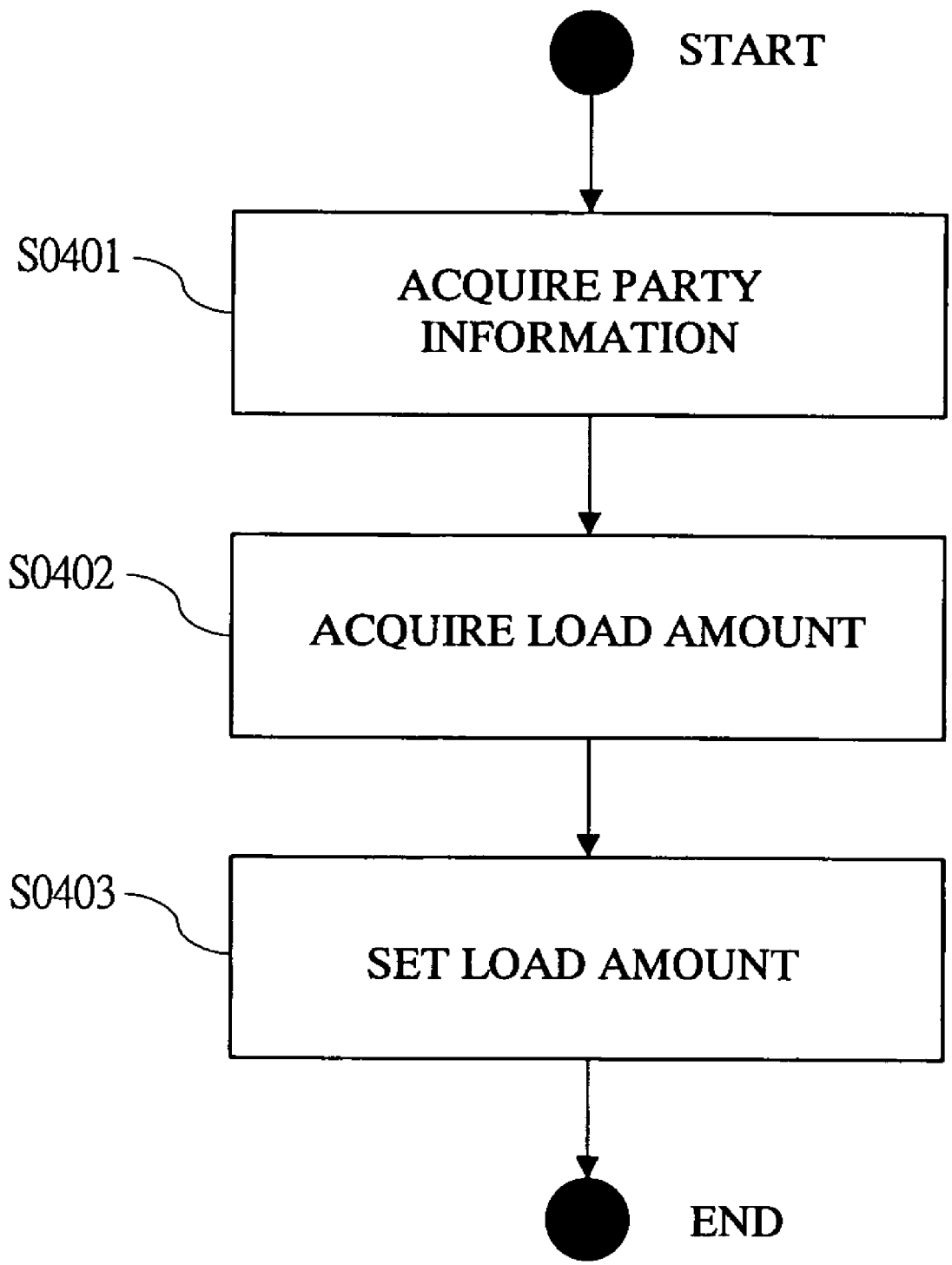

| PARTY | LOAD AMOUNT | MONITORING AGENT PROGRAM | OBJECT TO BE MONITORED | MONITORING INTERVAL |
|---|---|---|---|---|
| FIRST PARTY | 15 | MONITORING AGENT PROGRAM L | OBJECT TO BE MONITORED 1 | 60 sec. |
| | | MONITORING AGENT PROGRAM L | OBJECT TO BE MONITORED 2 | 60 sec. |
| | | MONITORING AGENT PROGRAM L | OBJECT TO BE MONITORED 3 | 300 sec. |
| SECOND PARTY | 20 | ......... | ......... | ......... |
| | | MONITORING AGENT PROGRAM L | OBJECT TO BE MONITORED N | 300 sec. |

| GROUP | PARTY | MONITORING AGENT PROGRAM | MONITORING INTERVAL |
|---|---|---|---|
| GROUP 1 | FIRST PARTY | MONITORING AGENT PROGRAM 1 | 60 sec. |
| | | MONITORING AGENT PROGRAM 2 | 60 sec. |
| | | MONITORING AGENT PROGRAM 3 | 300 sec. |
| | | ............ | ............ |
| | | MONITORING AGENT PROGRAM N | 300 sec. |
| | SECOND PARTY | MONITORING AGENT PROGRAM M | 90 sec. |
| GROUP 2 | FIRST PARTY | MONITORING AGENT PROGRAM N+1 | 200 sec. |
| | | ............ | ............ |
| | SECOND PARTY | MONITORING AGENT PROGRAM M+1 | 200 sec. |

| CORRELATION | CORRELATION GROUP 1 | CORRELATION GROUP 2 |
|---|---|---|
| CORRELATION 1 | GROUP 1 | GROUP 2 |

| OBJECT TO BE MONITORED | ATTRIBUTE | ATTRIBUTE VALUE |
|---|---|---|
| LOAD DISPERSION SERVER | USER NAME | USER 1 |
| | APPLICATION NAME | LOAD DISPERSION |
| | APPLICATION VERSION | 1.00 |
| | NUMBER OF CPUs | 1 |
| WEB SERVER 1 | USER NAME | USER 1 |
| | APPLICATION NAME | WEB CONTAINER |
| | APPLICATION VERSION | 2.00 |
| | NUMBER OF CPUs | 1 |
| WEB SERVER 2 | USER NAME | USER 1 |
| | APPLICATION NAME | WEB CONTAINER |
| | APPLICATION VERSION | 2.00 |
| | NUMBER OF CPUs | 1 |
| WEB SERVER 3 | USER NAME | USER 1 |
| | APPLICATION NAME | WEB CONTAINER |
| | APPLICATION VERSION | 2.00 |
| | NUMBER OF CPUs | 2 |
| WEB SERVER 4 | USER NAME | USER 1 |
| | APPLICATION NAME | WEB CONTAINER |
| | APPLICATION VERSION | 2.00 |
| | NUMBER OF CPUs | 2 |
| NFS SERVER | USER NAME | USER 1 |
| | APPLICATION NAME | NFS |
| | APPLICATION VERSION | 3.00 |
| | NUMBER OF CPUs | 1 |

FIG. 28

| CORRELATION | CORRELATION GROUP 1 | CORRELATION GROUP 2 |
|---|---|---|
| CORRELATION 1 | USER 1 GROUP | LOAD DISPERSION GROUP |
| CORRELATION 2 | USER 1 GROUP | WEB GROUP |
| CORRELATION 3 | USER 1 GROUP | NFS GROUP |
| CORRELATION 4 | LOAD DISPERSION GROUP | WEB GROUP |
| CORRELATION 5 | WEB GROUP | NFS GROUP |
| CORRELATION 6 | NFS GROUP | LOAD DISPERSION GROUP |
| CORRELATION 7 | WEB GROUP | WEB GROUP 1 |
| CORRELATION 8 | WEB GROUP | WEB GROUP 2 |
| CORRELATION 9 | WEB GROUP 1 | WEB GROUP 2 |

| CORRELATION | CORRELATION GROUP 1 | CORRELATION GROUP 2 | CORRELATED DEGREE |
|---|---|---|---|
| CORRELATION 1 | GROUP 1 | GROUP 2 | 70 |

| ATTRIBUTE | ATTRIBUTE VALUE 0201 | | | | | | | | | | | | | |
|---|---|---|---|---|---|---|---|---|---|---|---|---|---|---|
| SERVER NAME | SERVER 1 | SERVER 2 | SERVER 3 | SERVER 4 | SERVER 5 | SERVER 6 | SERVER 7 | SERVER 8 | SERVER 9 | SERVER 10 | SERVER 11 | SERVER 12 | SERVER 13 | SERVER 14 |
| APPLICATION NAME | WEB SERVER | WEB SERVER | WEB SERVER | WEB SERVER | WEB SERVER | WEB SERVER | WEB SERVER | WEB SERVER | WEB SERVER | WEB SERVER | WEB SERVER | WEB SERVER | WEB SERVER | WEB SERVER |
| CPU NAME | CPU-1 | CPU-1 | CPU-1 | CPU-1 | CPU-2 | CPU-2 | CPU-2 | CPU-2 | CPU-2 | CPU-3 | CPU-3 | CPU-3 | CPU-3 | CPU-3 |
| CPU OPERATING FREQUENCY | 1.5GHz | 1.5GHz | 1.5GHz | 1.5GHz | 2.0GHz | 2.0GHz | 2.2GHz | 2.2GHz | 2.2GHz | 3.0GHz | 3.0GHz | 3.0GHz | 3.2GHz | 3.2GHz |
| NUMBER OF CPUs | 2 | 2 | 1 | 1 | 1 | 1 | 1 | 1 | 1 | 1 | 1 | 1 | 1 | 1 |
| SECONDARY CACHE SIZE | 2MB | 2MB | 2MB | 2MB | 512KB | 512KB | 512KB | 512KB | 512KB | 512KB | 512KB | 512KB | 1MB | 1MB |
| MAIN MEMORY CAPACITY | 2GB | 2GB | 2GB | 2GB | 512MB | 512MB | 512MB | 512MB | 512MB | 1GB | 1GB | 1GB | 1GB | 1GB |
| MEMORY BUS OPERATING FREQUENCY | 400MHz | 400MHz | 400MHz | 400MHz | 400MHz | 400MHz | 400MHz | 400MHz | 400MHz | 800MHz | 800MHz | 800MHz | 800MHz | 800MHz |
| HDD CAPACITY | 80GB | 80GB | 80GB | 80GB | 80GB | 80GB | 120GB | 120GB | 120GB | 160GB | 160GB | 160GB | 160GB | 160GB |
| HDD SEEK TIME | 0.8ms | 0.8ms | 0.8ms | 0.8ms | 1.5ms | 1.5ms | 1.2ms | 1.2ms | 1.2ms | 1.0ms | 1.0ms | 1.0ms | 1.0ms | 1.0ms |
| HDD BUFFER SIZE | 4MB | 4MB | 4MB | 4MB | 2MB | 2MB | 2MB | 2MB | 2MB | 2MB | 2MB | 2MB | 2MB | 2MB |

FIG. 39

| ATTRIBUTE | ATTRIBUTE VALUE | | | | | | | | | | | | | |
|---|---|---|---|---|---|---|---|---|---|---|---|---|---|---|
| | SERVER 1 | SERVER 2 | SERVER 3 | SERVER 4 | SERVER 5 | SERVER 6 | SERVER 7 | SERVER 8 | SERVER 9 | SERVER 10 | SERVER 11 | SERVER 12 | SERVER 13 | SERVER 14 |
| SERVER NAME | WEB SERVER | WEB SERVER | WEB SERVER | WEB SERVER | WEB SERVER | WEB SERVER | Java APLI-CATION | Java APLI-CATION | Java APLI-CATION | Java APLI-CATION | Java APLI-CATION | Java APLI-CATION | Java APLI-CATION | Java APLI-CATION |
| APPLICATION NAME | | | | | | | | | | | | | | |
| WEB CACHE SIZE | 1GB | 1GB | 1GB | 512MB | 512MB | 512MB | — | — | — | — | — | — | — | — |
| JVM MAXIMUM USE MEMORY CAPACITY | — | — | — | — | — | — | 512MB | 512MB | 512MB | 512MB | 384MB | 384MB | 384MB | 384MB |

| ATTRIBUTE | ATTRIBUTE VALUE 0203 ||||||||||||||
|---|---|---|---|---|---|---|---|---|---|---|---|---|---|---|
| NAME OF VIRTUAL COMPUTING MACHINE | VIRTUAL COMPUTING MACHINE 1 | VIRTUAL COMPUTING MACHINE 2 | VIRTUAL COMPUTING MACHINE 3 | VIRTUAL COMPUTING MACHINE 4 | VIRTUAL COMPUTING MACHINE 5 | VIRTUAL COMPUTING MACHINE 6 | VIRTUAL COMPUTING MACHINE 7 | VIRTUAL COMPUTING MACHINE 8 | VIRTUAL COMPUTING MACHINE 9 | VIRTUAL COMPUTING MACHINE 10 | VIRTUAL COMPUTING MACHINE 11 | VIRTUAL COMPUTING MACHINE 12 | VIRTUAL COMPUTING MACHINE 13 | VIRTUAL COMPUTING MACHINE 14 |
| SERVER NAME | SERVER 1 || SERVER 2 || SERVER 3 || SERVER 4 || SERVER 5 || SERVER 6 |||
| CPU ALLOCATION RATE | 70% | 30% | 70% | 30% | 50% | 50% | 50% | 50% | 50% | 50% | 25% | 25% | 25% | 25% |
| MEMORY ALLOCATION SIZE | 512MB | 384MB | 512MB | 384MB | 512MB | 384MB | 256MB | 256MB | 256MB | 256MB | 256MB | 256MB | 256MB | 256MB |

| ATTRIBUTE | ATTRIBUTE VALUE | | | | | | | | | | | | | |
|---|---|---|---|---|---|---|---|---|---|---|---|---|---|---|
| SERVER NAME | SERVER 1 | SERVER 2 | SERVER 3 | SERVER 4 | SERVER 5 | SERVER 6 | SERVER 7 | SERVER 8 | SERVER 9 | SERVER 10 | SERVER 11 | SERVER 12 | SERVER 13 | SERVER 14 |
| APPLICATION NAME | LOAD DISPERSION SERVER | WEB SERVER | WEB SERVER | WEB SERVER | WEB SERVER | WEB SERVER | WEB SERVER | WEB SERVER | WEB SERVER | WEB SERVER | WEB SERVER | NFS SERVER | NFS SERVER | NFS SERVER |
| COMMON FILE DESTINATION | — | SERVER 1 | SERVER 1 | SERVER 2 | SERVER 2 | SERVER 2 | SERVER 2 | SERVER 3 | SERVER 3 | SERVER 3 | SERVER 3 | — | — | — |
| PROVIDED FILE TYPE | — | — | — | — | — | — | — | — | — | — | — | HTML FILE | IMAGE FILE | VIDEO FILE |

MONITORING SYSTEM AND MONITORING METHOD

CROSS-REFERENCE TO RELATED APPLICATION

The present application claims priority from Japanese Patent Application No. JP 2005-164630 filed on Jun. 3, 2005, the content of which is hereby incorporated by reference into this application.

TECHNICAL FIELD OF THE INVENTION

The present invention relates to a monitoring technology. More particularly, it relates to the technology effectively applied to a monitoring system that monitors a performance of an information processing system and a monitoring method thereof.

BACKGROUND OF THE INVENTION

For example, in the information processing system that provides information service required with high performance quality, in particular, service for unspecified number of users (hereinafter, service system), it is an essential condition for success in business to provide service with high performance quality. For this reason, in such service systems, performance is generally monitored so as to detect the degradation in performance quality early. By the performance monitoring, the degradation in performance quality is detected early, and a suitable countermeasure is taken against the degradation in performance quality. As a result, the serious accident can be prevented in advance.

The information processing system for monitoring the performance (hereinafter, referred to as performance monitoring system) periodically checks the performance information of the components constituting the service system (hereinafter, referred to as object to be monitored) and confirms whether the performance of the system is insufficient and presumed performance is produced.

A general configuration of the performance monitoring systems will be described. The performance monitoring systems are comprised of a monitoring manager program and a plurality of monitoring agent programs. The monitoring agent programs periodically monitor and analyze the states of one or more objects to be monitored, and if any trouble occurs, they notify the trouble to the monitoring manager program. The monitoring manager program controls and manages the monitoring agent programs. The monitoring manager program operates on an information processing apparatus for management provided separately from the service system. The monitoring agent programs operate on computing machines (objects to be monitored) which constitute the service system.

A flow of a monitoring process in the performance monitoring system will be described below. (1) The monitoring agent programs periodically acquire performance information from objects to be monitored at a monitoring interval 1 (1-1), analyze the performance information acquired periodically at a longer monitoring interval 2 than the monitoring interval 1 (1-2), and when the states of the objects to be monitored are determined as abnormal as a result of the analysis, they notify the trouble to the monitoring manager program (1-3).

(2) The monitoring manager program receives the notification from the monitor agent programs and analyzes an entire state of the service system (2-1), and when any countermeasure is necessary as a result of the analysis, it instructs the countermeasure by communicating with a manager and the like (2-2).

The first objective in the performance monitoring system is the reduction of the monitoring cost in the monitoring of a large-scale service system. The monitoring cost is the calculation resources such as a CPU, a memory, a network band and a disk space which are used for executing the monitoring process of the programs of a monitoring system, namely, the monitoring process of the above-mentioned performance monitoring system.

In the monitoring of a large-scale service system, the cost of (1-1), (1-2) and (2-1) in the above-mentioned monitoring process are particularly high. The processes at (1-1) and (1-2) increase in proportional to the number of information processing apparatuses constituting the service system, namely, the number of monitoring agent programs. Also, since the number of monitoring agent programs to be the trouble notification sources increases, the monitoring cost of the process at (2-1) also increases. Further, since the trouble notification tends to be transmitted simultaneously from a plurality of monitoring agent programs, the process at (2-1) abruptly increases.

The mere reduction of the monitoring cost can be achieved by increasing the monitoring interval to reduce the number of monitorings per unit time. When the number of monitorings is reduced, consumption of the calculation resources used in the monitoring process can be reduced, and thus, the monitoring cost can be reduced.

This method, however, has a disadvantage that monitoring capability is degraded. When the monitoring interval is lengthened, the trouble which occurs between monitorings cannot be found, and thus the detection of the trouble is delayed or the trouble cannot be detected. That is to say, the length of the monitoring interval and the detecting capability are in a trade-off relationship.

The method obtained by improving the method described above, in which the monitoring cost can be reduced and the detection delay can be prevented by dynamically adjusting the monitoring interval, is proposed in Japanese Patent Laid-Open Publication Nos. 2004-178118, 5-205074, 7-152706 and 8-275260.

In the technology in Japanese Patent Laid-Open Publication No. 2004-178118, there are a plurality of monitoring items monitored by the monitoring agent programs and when a monitoring interval of one of the items is shortened, the monitoring intervals of the other monitoring items are lengthened. As a result, the total increase in the monitoring cost is prevented.

In the technology in Japanese Patent Laid-Open Publication No. 5-205074, the monitoring manager program dynamically changes the interval at which measured data are collected from the monitoring agent programs so as to reduce the monitoring cost and the communication traffic by the monitoring agent programs. The monitoring interval is changed at the time when the measured data satisfy a predetermined condition.

In the technology in Japanese Patent Laid-Open Publication No. 7-152706, the monitoring agent programs measure utilization of CPU, and when the measured value is greatly changed from the previous measured value, the frequency of notification to the monitoring manager program is increased.

In the technology in Japanese Patent Laid-Open Publication No. 8-275260, when the data measured by the monitoring agent programs are not changed from the previously measured data, the measured data are not transmitted to the monitoring manager program.

The second objective of the performance monitoring system is the response to the change in configuration of the service system. The configuration of the service system is possibly changed during operation. For example, in the case where a defective information processing apparatus is disconnected from the service system, the configuration of the service system is changed.

Further, in recent years, a lot of systems called "work load management system", which autonomously change the configuration of the service system are proposed. This system monitors a load on the service system, and increases or decreases the information processing apparatuses to or from the service system in accordance with the load amount.

When the configuration of the service system is changed in such a manner, the setting of the performance monitoring system should be also changed accordingly. A method for automatically changing the setting of the monitoring system according to the change in the configuration of the service system is proposed in Japanese Patent Laid-Open Publication Nos. 2000-92091 and No. 2003-271471.

In the technology in Japanese Patent Laid-Open Publication No. 2000-92091, information processing apparatuses constituting the service system are divided into some groups. Further, one or more monitoring manager programs are provided in one service system. Each of the information processing apparatuses has a table in which a correlation between the information processing apparatuses and the monitoring manager program is described. When the configuration is changed, for example, when the number of the information processing apparatuses increases or decreases or the number of the monitoring manager programs, namely, the number of the information processing apparatuses where the monitoring manager programs operate increases or decreases, the table is updated.

In the technology in Japanese Patent Laid-Open Publication No. 2003-271471, information processing apparatuses constituting the service system are divided into some groups. An address list of information processing apparatuses included in the group is created for each group, and all the information processing apparatuses hold the address lists of all groups. Further, all the information processing apparatuses hold a tree structure where related groups are connected by links. When the configuration of the service system is changed, the tree structures are sequentially referenced, and contents of the change in the configuration are transmitted to the information processing apparatuses in the respective groups, so that the change is reflected on the address lists and the tree structures.

SUMMARY OF THE INVENTION

Incidentally, in the above-mentioned performance monitoring system, the first objective is the reduction of the total monitoring cost in accordance with the configuration of a large-scale service system. The technology disclosed in Japanese Patent Laid-Open Publication Nos. 2004-178118, 5-205074, 7-152706, 8-275260 relates to the technology for the reduction in the monitoring cost of individual information processing apparatuses constituting the service system, but does not mention the method for reducing the monitoring cost by referencing the entire configuration of the service system.

Also, the second objective is to comprehend the state of the service system after the change in the configuration early. The change in the configuration of the service system has a certain purpose. For example, a purpose of the increase in the information processing apparatuses to the service system is to improve the service quality. After the configuration of the service system is changed, it is necessary to confirm the effects of the configuration change early. This is because another countermeasure should be taken when the change produces no effect. The technology disclosed in Japanese Patent Laid-Open Publication Nos. 2000-92091 and 2003-271471 produces the effect that the setting of the monitoring system can automatically follow the change in the configuration of the service system, but the early recognition of the state of the service system after the configuration change is not taken into consideration.

Therefore, an object of the present invention is to provide a monitoring technology capable of reducing the monitoring cost in total without degrading the monitoring capability in accordance with the configuration of a large-scale service system and capable of comprehending the state of the service system after the configuration change early.

The above and other objects and novel characteristics of the present invention will be apparent from the description of this specification and the accompanying drawings.

The typical ones of the inventions disclosed in this application will be briefly described as follows.

In a monitoring system and a monitoring method thereof in the present invention, information processing apparatuses constituting a service system (objects to be monitored, more concretely, monitoring agent programs included in the objects to be monitored) are divided into a plurality of parties, the information processing apparatuses included in some parties are intensely monitored, namely, monitored at a short monitoring interval, and the information processing apparatus in the other parties are loosely monitored, namely monitored at a long monitoring interval. By controlling the monitoring intervals on the basis of the parties as described above, the monitoring cost of the entire monitoring system can be reduced.

Also, in the monitoring system and the monitoring method thereof in the present invention, the information processing apparatuses constituting the service system are divided into a plurality of groups, and the management of the monitoring interval on the basis of the parties is performed in each of the groups. Each of the groups includes a plurality of "coessential" information processing apparatuses. More specifically, the information processing apparatuses having the same performance characteristic are included in the same group. Since the performance characteristics of the information processing apparatuses are the same in each of the groups, when the states of performance of the information processing apparatuses in the parties which are intensely monitored are comprehended, the states of performance of the information processing apparatuses in the parties of the same groups which are loosely monitored can be estimated with high accuracy. Therefore, the monitoring cost can be reduced, and simultaneously, the ability to comprehend the performance states by means of the monitoring can be maintained.

The effect obtained by the representative one of the inventions disclosed in this application will be briefly described as follows.

According to the present invention, a total monitoring cost can be reduced without degrading a monitoring capability in accordance with the configuration of a large-scale service system. Further, the state of the service system after the configuration change can be comprehended early.

BRIEF DESCRIPTIONS OF THE DRAWINGS

FIG. 2 is a diagram illustrating a party management table in the monitoring system according to the first embodiment of the present invention;

FIG. 3 is a diagram illustrating another party management table in the monitoring system according to the first embodiment of the present invention;

FIG. 7 is a diagram illustrating a party management table in the monitoring system according to the second embodiment of the present invention;

FIG. 8 is a diagram illustrating another party management table in the monitoring system according to the second embodiment of the present invention;

FIG. 9 is a diagram illustrating a monitoring intensity table in the monitoring system according to the second embodiment of the present invention;

FIG. 11 is a block diagram illustrating the monitoring agent programs in the monitoring system according to a third embodiment of the present invention;

FIG. 12 is a diagram illustrating the monitoring intensity table in the monitoring system according to the third embodiment of the present invention;

FIG. 15 is a diagram illustrating a setting example (pattern 1) of parties and load amount management table in the monitoring system according to the fourth embodiment of the present invention;

FIG. 16 is a diagram illustrating a setting example (pattern 2) of the parties and load amount management table in the monitoring system according to the fourth embodiment of the present invention;

FIG. 17 is a flowchart illustrating a load amount setting process in the monitoring system according to the fourth embodiment of the present invention;

FIG. 21 is a diagram illustrating a group table in the monitoring system according to the sixth embodiment of the present invention;

FIG. 27 is a diagram illustrating an attribute table in the monitoring system according to the eighth embodiment of the present invention;

FIG. 28 is a diagram illustrating a correlation table in the monitoring system according to the eighth embodiment of the present invention;

FIG. 35 is a diagram illustrating an attribute table in the monitoring system according to a tenth embodiment of the present invention;

FIG. 39 is a diagram illustrating the attribute table in the monitoring system according to an eleventh embodiment of the present invention;

FIG. 41 is a diagram illustrating an attribute table in the monitoring system according to a twelfth embodiment of the present invention;

FIG. 43 is a diagram illustrating an attribute table in the monitoring system according to a thirteenth embodiment of the present invention;

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

Although not particularly limited, the computing machines and information processing apparatuses such as servers constituting a service system are the objects to be monitored in the following description of the embodiments of the present invention.

Figure 1:
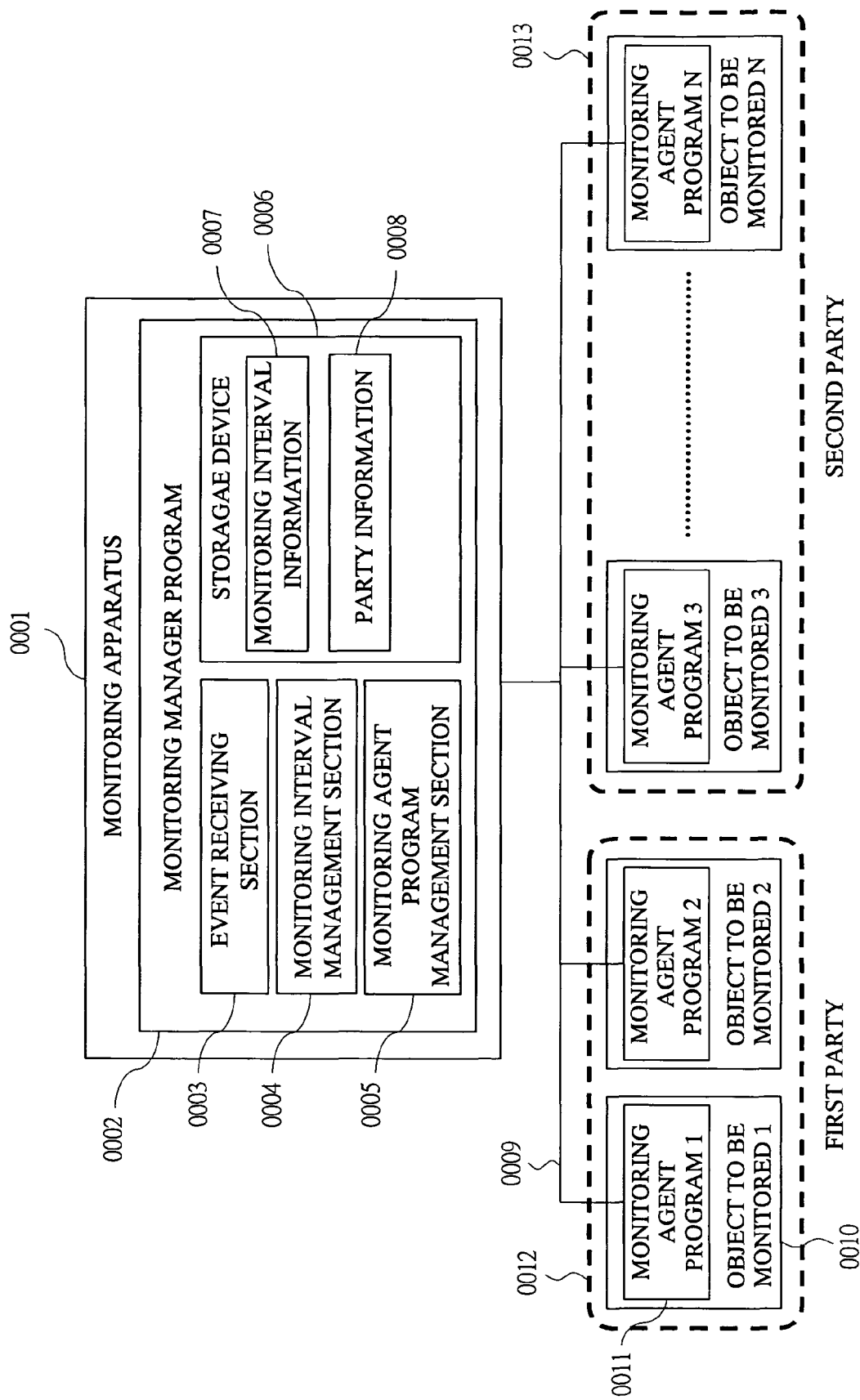
FIG. 1 is a block diagram illustrating a monitoring system according to a first embodiment of the present invention.

FIG. 1 is a block diagram illustrating a monitoring system according to the first embodiment of the present invention.

The monitoring system is comprised of one monitoring manager program 0002 and N monitoring agent programs 0011, and the i-th monitoring agent program 0011 monitors an i-th object to be monitored 0010. The monitoring manager program 0002 operates on a monitoring apparatus 0001, and the monitoring agent programs 0011 operate on the respective objects to be monitored 0010. The monitoring apparatus 0001 and the objects to be monitored 0010 are connected through LAN 0009 and are communicable with each other.

The monitoring agent program 1 and the monitoring agent program 2 are included in a first party 0012, and the monitoring agent program 3 to the monitoring agent program N are included in a second party 0013.

The monitoring manager program 0002 will be described later in detail, but it has a function to divide the monitoring agent programs 0011 into respective parties, a function to exchange the monitoring agent programs 0011 in the respective parties between the parties, and a function to analyze contents of an event and calculate the number of the monitoring agent programs 0011 in the respective parties and a monitoring interval at which the monitoring agent programs 0011 in the respective parties monitor the objects to be monitored 0010 and then instruct the monitoring agent programs 0011 to change the monitoring interval in accordance with the result of the calculation.

Further, the monitoring manager program 0002 has a function to receive an event that the configuration of the objects to be monitored 0010 is changed and shorten the calculated monitoring interval after the reception of the event. Also, it has a function to receive a trouble event when a trouble occurs in the object to be monitored 0010 and a function to shift the monitoring agent program 0011 included in the party of the longer monitoring interval than the short monitoring interval to the party of the short monitoring interval when the monitoring agent program 0011 corresponding to the trouble event is included in the party of the short monitoring interval after the reception of the trouble event.

The monitoring agent programs 0011 will be described later in detail, but they have a function to monitor the objects to be monitored 0010 at a predetermined interval and a function to notify the event to the monitoring manger program 0002 when information acquired by monitoring the objects to be monitored 0010 satisfies a predetermined condition.

The monitoring manager program 0002 includes an event receiving section 0003, a monitoring interval management section 0004, a monitoring agent program management section 0005, and a storage device 0006. The storage device 0006 stores monitoring interval information 0007 and party information 0008.

A party management table 0100 as an example of the storage of the monitoring interval information 0007 and the party information 0008 is shown in FIG. 2. The party management table 0100 stores the monitoring agent programs 0011 in the respective parties and their monitoring intervals. Also, a configuration example of another party management table 0101 is shown in FIG. 3. In the party management table 0100 of FIG. 2, the monitoring interval is recorded for each monitoring agent program 0011, but in the party management table 0101 of FIG. 3, the monitoring interval is recorded for each party.

Figure 4:
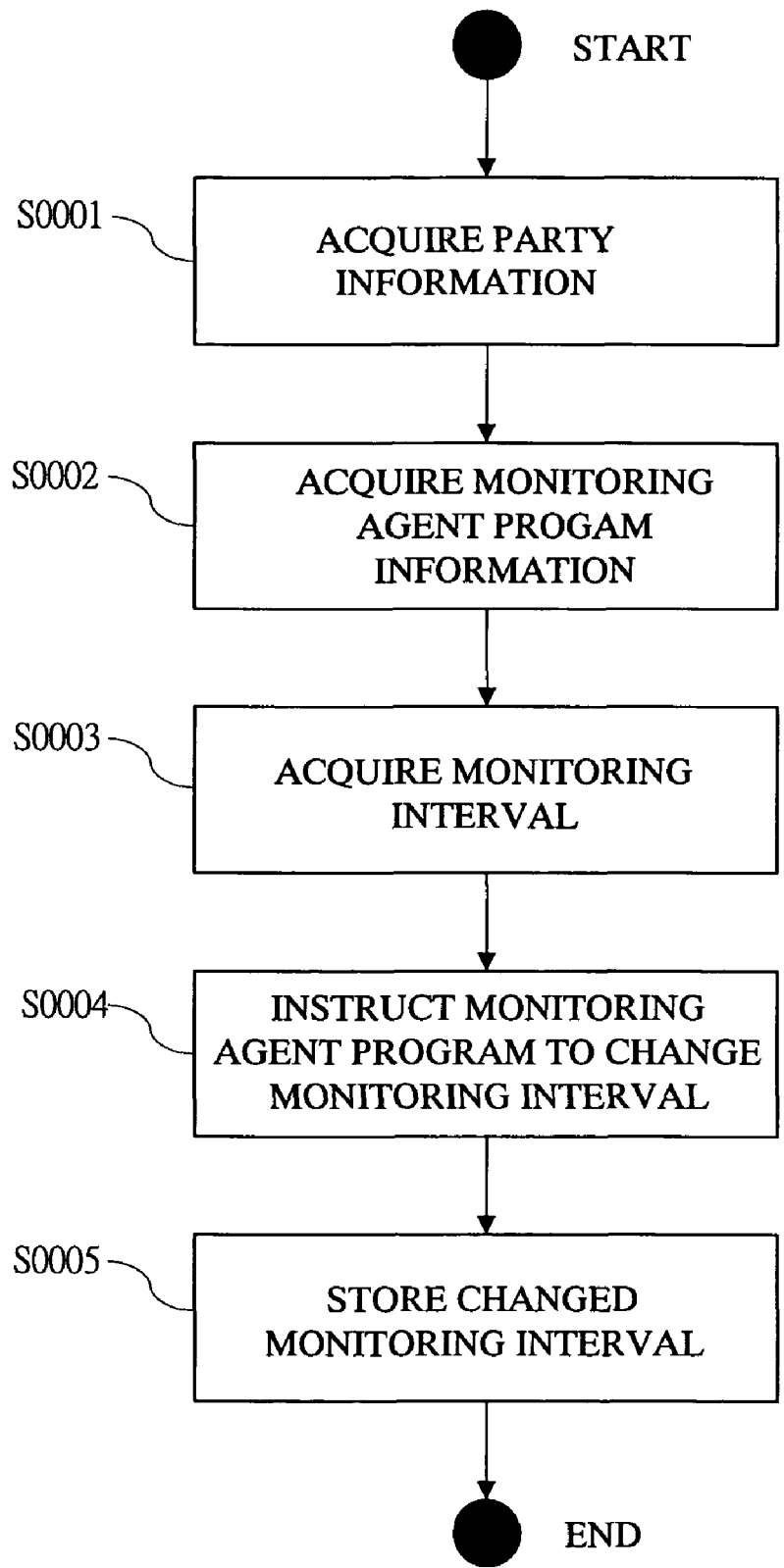
FIG. 4 is a flowchart illustrating a process for exchanging monitoring agent programs in parties between the parties in the monitoring system according to the first embodiment of the present invention.

FIG. 4 is a flowchart of a process for exchanging the monitoring agent programs 0011 in the parties between the parties by the monitoring manager program 0002. The process is started when the event receiving section 0003 receives an event of an exchanging instruction, or by a timer in the monitoring manager program 0002.

First, the monitoring interval management section 0004 acquires the party information from the storage device 0006 (S0001), and selects two exchanging parties. Next, information of the monitoring agent programs in the parties is acquired (S0002), and one monitoring agent program 0011 is selected in each party. Subsequently, the monitoring intervals set in the each selected monitoring agent programs 0011 are acquired from the storage device 0006 (S0003). Then, the monitoring intervals are exchanged between the monitoring agent programs 0011, and the monitoring agent program management section 0005 instructs the monitoring agent programs 0011 to change the monitoring intervals to set the new monitoring intervals (S0004). Finally, the changed monitoring intervals are stored in the storage device 0006 (S0005).

Figure 5:
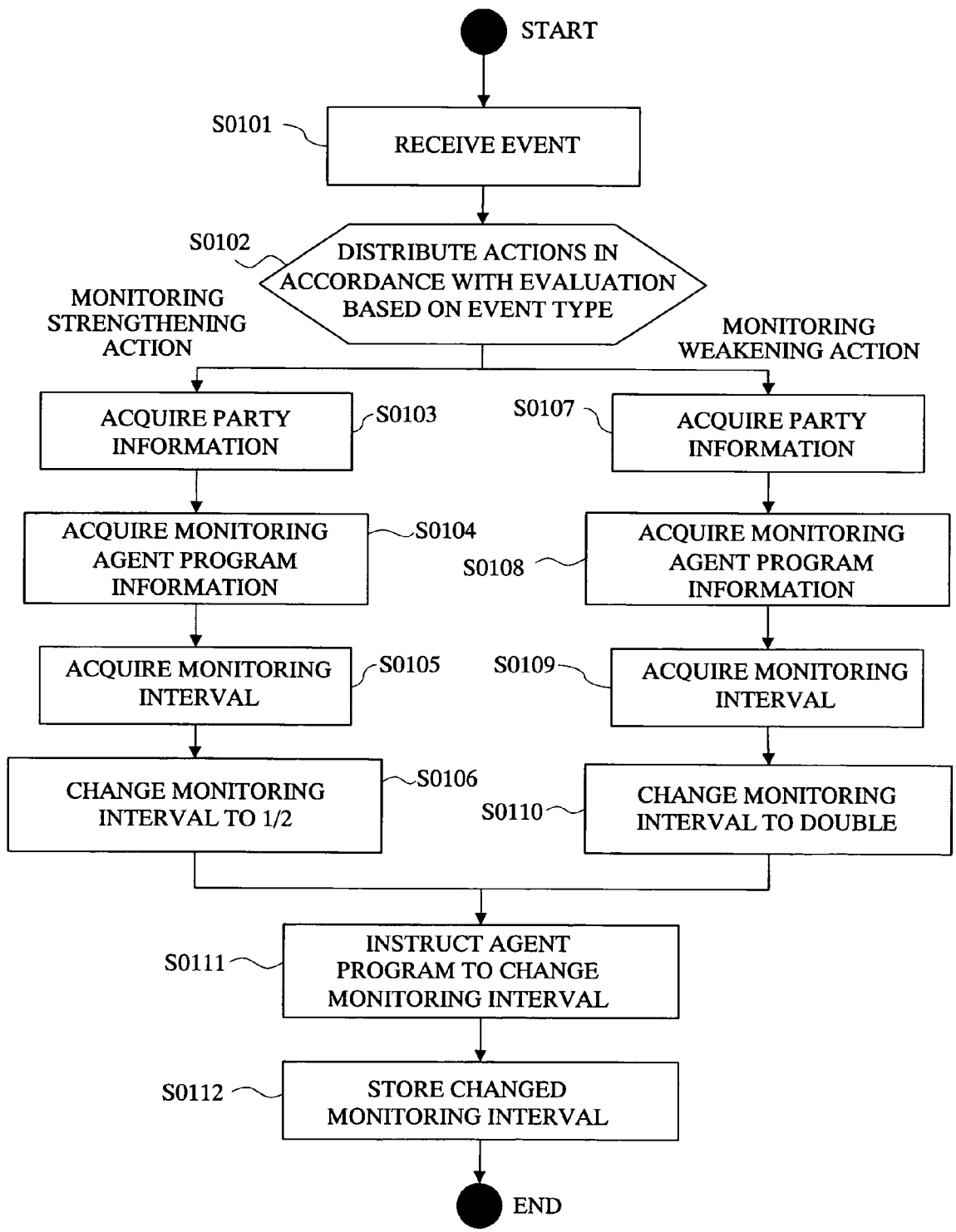
FIG. 5 is a flowchart illustrating a monitoring strengthening/weakening process in the monitoring system according to the first embodiment of the present invention.

FIG. 5 is a flowchart of a monitoring strengthening/weakening process in the monitoring manager program 0002. The monitoring strengthening process is a process for shortening the intervals at which the monitoring agent programs 0011 in the parties monitor the objects to be monitored 0010. On the contrary, the monitoring weakening process is a process for extending the monitoring intervals.

The process is started when the event receiving section 0003 receives an event (S0101). The event is, for example, an event to notify the decrease/increase to the monitoring manager program when the monitoring agent programs 0011 detect increase or decrease in load on the objects to be monitored 0010, or an instruction event which is given to the monitoring manager program 0002 by a system manager.

The contents of the events are evaluated, and accordingly the actions are distributed (S0102). When the contents of the event are the instruction for strengthening the monitoring, a monitoring strengthening action is taken, and when the contents of the event are the instruction for weakening the monitoring, a monitoring weakening action is taken.

In the monitoring strengthening action, the monitoring intervals set in the monitoring agent programs 0011 in the parties are shortened, in this case, shortened to half. First, the monitoring interval management section 0004 firstly acquires the party information from the storage device 0006 (S0103) and then acquires the information of the monitoring agent programs in the parties (S0104). Next, the monitoring interval management section 0004 acquires the current monitoring intervals set in the monitoring agent programs (S0105), and calculates a half of the value to change the monitoring intervals to ½ (S0106). Subsequently, the monitoring agent program management section 0005 notifies the changed monitoring intervals to the monitoring agent programs 0011, and instructs them to change the monitoring intervals, thereby changing the monitoring intervals (S0111). Finally, the changed monitoring intervals are stored in the storage device 0006 (S0112). The flow of the monitoring weakening action (S0107 to S0110) is the same as that of the monitoring strengthening action except that the monitoring intervals are not shortened to half but are doubled.

Figure 13:
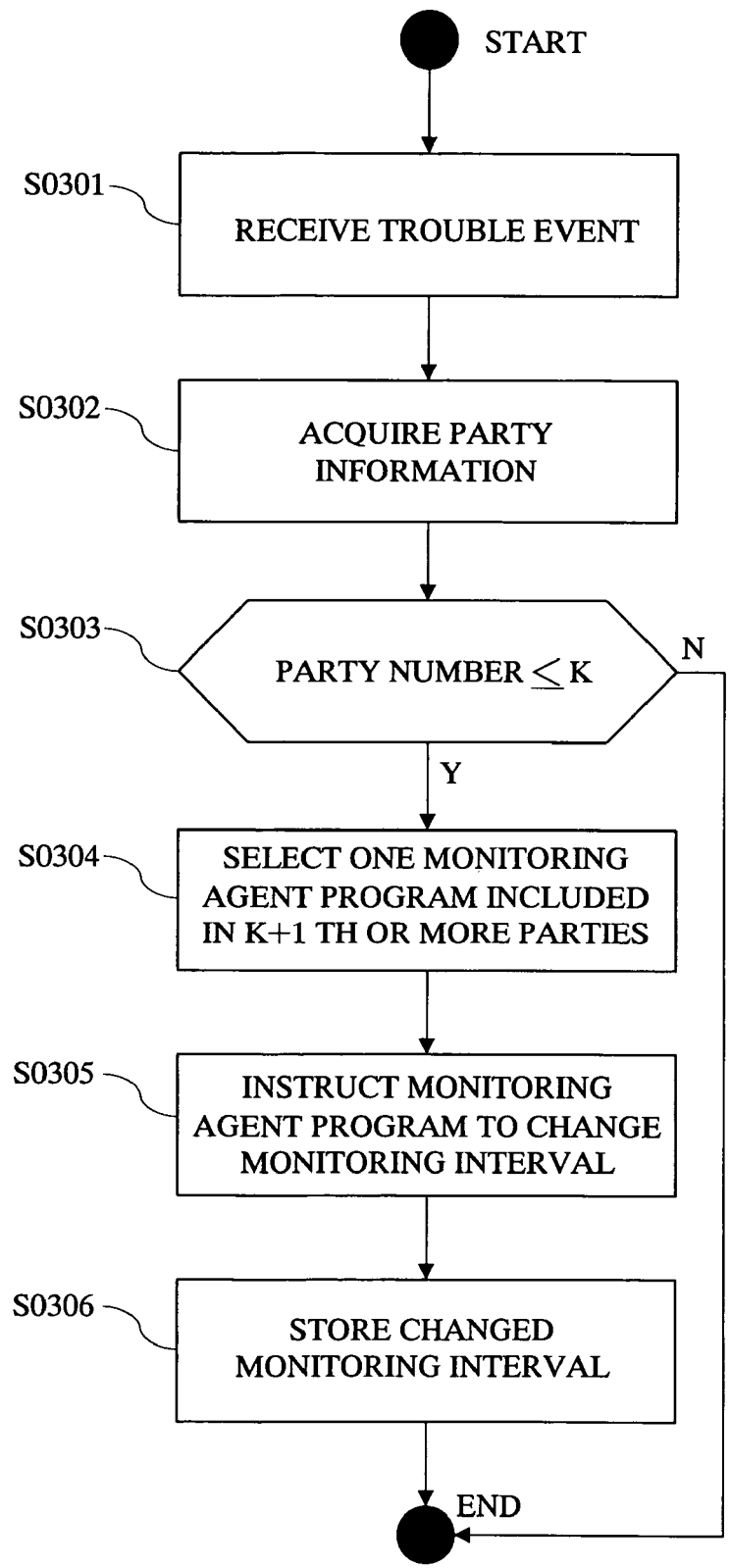
FIG. 13 is a flowchart illustrating a process performed when a trouble occurs in the monitoring system according to the first embodiment of the present invention.

FIG. 13 is a flowchart of a process performed in the monitoring manager program 0002 when a trouble occurs in the monitoring agent programs 0011 or the objects to be monitored 0010. In this flowchart, when the trouble occurs is a party with smaller number, namely, in the party where intense monitoring is executed, a substitute monitoring agent program 0011 is allocated thereto from a party where loose monitoring is executed.

First, the event receiving section 0003 receives a trouble event (S0301). Next, the information of a party where the trouble occurs is acquired from the storage device 0006 (S0302). Subsequently, the number of the party where the trouble occurs is evaluated, and when the party number is larger than K, the process is ended, but when the party number is K or less, the sequence goes to the next step (S0303). At the next step, one of the monitoring agent programs 0011 in the (K+1)th or more parties is selected (S0304), and at next two steps, the monitoring agent program 0011 is made to be included in the party where the trouble occurs. More specifically, the instruction to change the monitoring interval to that of the party where the trouble occurs is issued to the monitoring agent program 0011 (S0305). Then, the changed monitoring interval is stored in the storage device 0006 (S0306).

Figure 6:
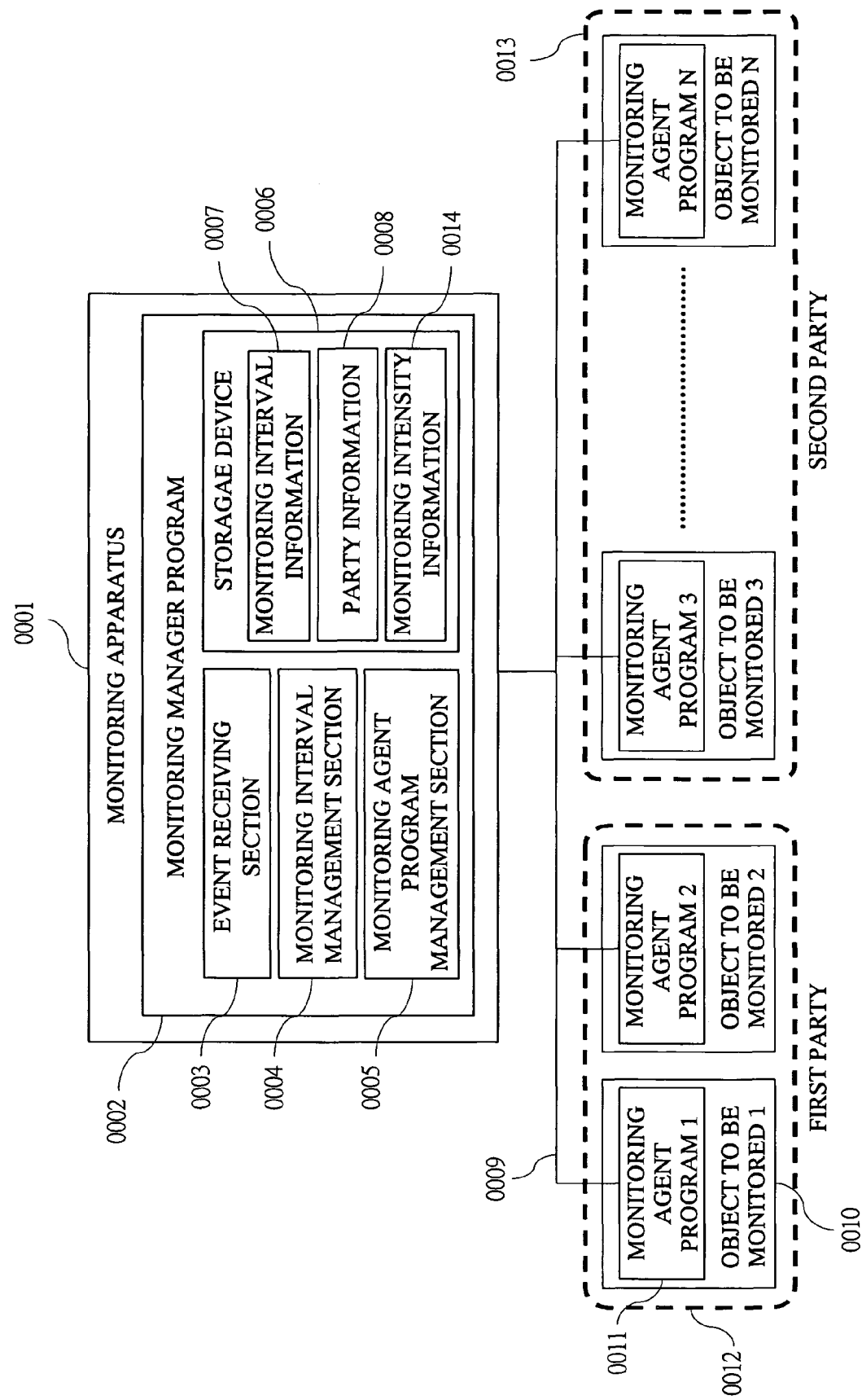
FIG. 6 is a block diagram illustrating the monitoring system according to a second embodiment of the present invention.

FIG. 6 is a block diagram of the monitoring system according to the second embodiment of the present invention. The monitoring system according to the second embodiment has the configuration obtained by adding monitoring intensity information 0014 to the configuration of the first embodiment shown in FIG. 1.

The monitoring intensity information 0014 is the information for correlating the monitoring intensity with the monitoring interval, and as the monitoring intensity becomes higher, the monitoring interval becomes shorter. FIG. 9 illustrates a monitoring intensity table 0104 as a concrete example of the monitoring intensity information to be stored in the storage device 0006. As shown in FIG. 9, the table 0104 is in the form of a mapping table in which the monitoring intensity is stored in a correlation with the monitoring interval.

Since the monitoring interval is expressed as the monitoring intensity, the configuration of the party management table 0102 is as shown in FIG. 7. More specifically, in the party management table shown in FIG. 2, the monitoring interval is stored for each monitoring agent program 0011, but in the party management table 0102 in FIG. 7, the monitoring intensity is stored for each monitoring agent program 0011. Further, a party management table 0103 where the monitoring intervals in the party management table shown in FIG. 3 are shown by the monitoring intensity is shown in FIG. 8.

Figure 10:
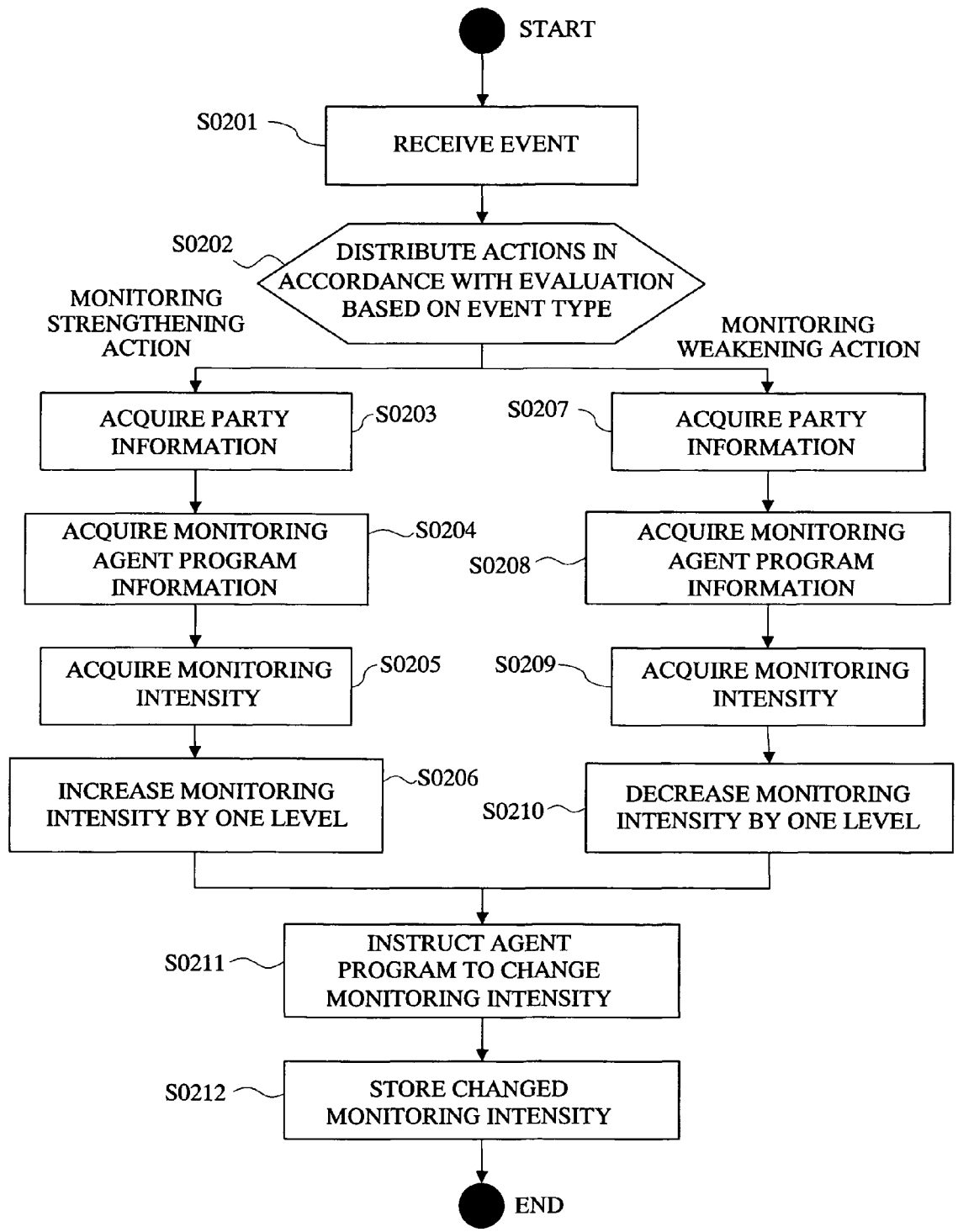
FIG. 10 is a flowchart illustrating the monitoring strengthening/weakening process in the monitoring system according to the second embodiment of the present invention.

FIG. 10 is a flowchart of the monitoring strengthening/weakening process in the monitoring system according to the second embodiment of the present invention. This flow is different from the flow of the monitoring strengthening/weakening process shown in FIG. 5 in the process for changing the monitoring intervals. More specifically, in the flow shown in FIG. 5, the monitoring intervals are directly treated, but in the flow of FIG. 10, the monitoring interval is changed depending on increase/decrease in the monitoring intensity.

In the monitoring strengthening action (S0203 to S0206) after the event reception (S0201) and the distribution of actions in accordance with the evaluation of the event types (S202) in the flow shown in FIG. 10, the monitoring intensity of the monitoring agent program 0011 where the monitoring is to be strengthened is acquired (S0205), and the monitoring intensity is then increased by one level (S0206). Subsequently, the monitoring interval corresponding to the monitoring intensity is acquired with reference to the monitoring intensity table, and the acquired monitoring interval is notified to the monitoring agent program 0011, and the instruction to change the monitoring interval is issued (S0211). Finally, the changed monitoring intensity is stored in the storage device 0006 (S0212). In the monitoring weakening action (S0207 to S0210), the monitoring intensity is not increased by one level but it is decreased by one level. The other process is the same as that in the monitoring strengthening action.

FIG. 11 is a block diagram of the monitoring agent program 0011 in the monitoring system according to the third embodiment of the present invention. The configuration of components other than the monitoring agent program 0011 is the same as that in the block diagram of the monitoring system shown in FIG. 6.

The monitoring agent program 0011 shown in FIG. 11 includes a statistical processing section 0015, a performance information acquiring section 0016, and a performance information temporary storage 0017. The monitoring agent program 0011 periodically acquires performance information from the object to be monitored 0010 at a first monitoring interval (hereinafter, monitoring interval 1) by means of the function of the performance information acquiring section 0016 (0020), and stores the acquired performance information into the performance information temporary storage 0017. The monitoring agent program 0011 periodically acquires performance information from the performance information temporary storage 0017 at a second monitoring interval (hereinafter, monitoring interval 2) and performs statistical process for the acquired performance information by means of the function of the statistical processing section 0015 (0019). When the result of the statistical process satisfies a predetermined condition, this state is transmitted as an event to the monitoring manager program 0002 (0018). More specifically, the monitoring agent program 0011 has two kinds of monitoring intervals: the monitoring interval 1; and the monitoring interval 2.

Since the monitoring agent program 0011 has two kinds of the monitoring intervals, the monitoring intensity table 0105 as the mapping table of the monitoring intensity and the monitoring interval is as shown in FIG. 12. More specifically, two columns of the monitoring interval 1 and the monitoring interval 2 are provided for the monitoring intensity.

Figure 14:
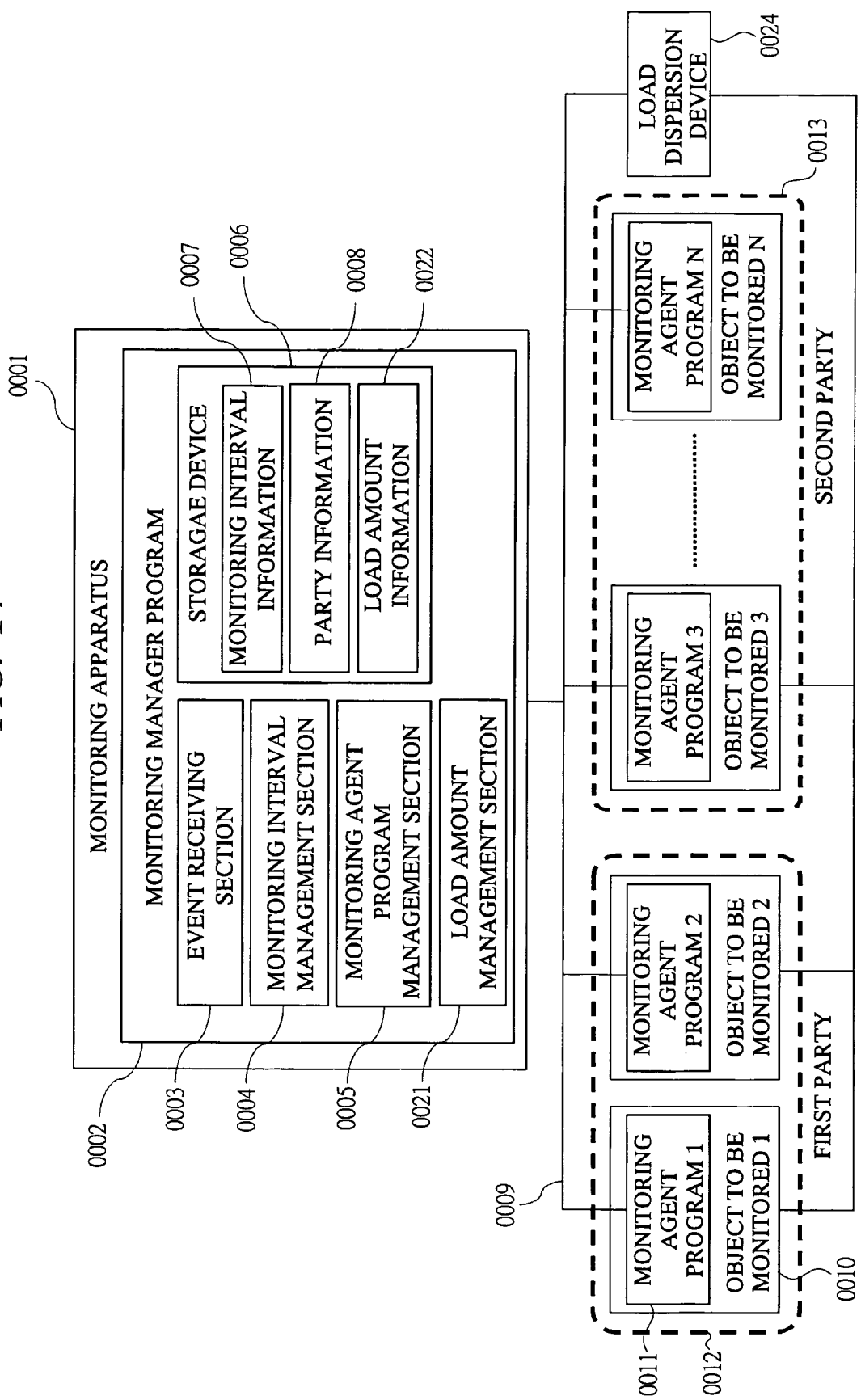
FIG. 14 is a block diagram illustrating the monitoring system according to a fourth embodiment of the present invention.

FIG. 14 is a block diagram illustrating the monitoring system according to the fourth embodiment of the present invention. The monitoring system according to the fourth embodiment has the configuration obtained by adding a load amount management section 0021, load amount information 0022, and a load dispersion device 0024 to the monitoring system according to the first embodiment shown in FIG. 1. The load dispersion device 0024 allocates the load to the objects to be monitored 1 to N. More specifically, requests from an end user are first received by the load dispersion device, and then, a number of requests in accordance with the respective rate of "set load amount" are sent to the objects to be monitored 1 to N.

The monitoring manager program 0002 according to the fourth embodiment has a function to change the above-mentioned set load amount which is set in the load dispersion device. The monitoring manager program 0002 uses the load amount management section 0021 and the load amount information 0022 stored in the storage device 0006 to change the set load amount.

The load amount information 0022 is stored by adding a column of the load mount to the party management table like a party and load amount management table 0106 shown in FIG. 15, for example. FIG. 15 illustrates that the set load amount on the objects to be monitored 1 and 2 which are monitored by the monitoring agent programs 1 and 2 respectively in the first party is 15. Similarly, FIG. 15 illustrates that the set load amount on the objects to be monitored which are monitored by the monitoring agent programs in the second party is 20.

The load amount management section 0021 sets the set load amount to the load dispersion device 0024 in accordance with the flowchart of the load amount setting process shown in FIG. 17. The load amount management section 0021 firstly acquires party information from the storage device 0006 (S0401), and then acquires load amount information of the monitoring agent programs 0011 in the respective parties (S0402). Subsequently, the load amount management section 0021 notifies the load amount on the objects to be monitored 0010 which are monitored by each of the monitoring agent programs 0011 to the load dispersion device 0024, and instructs the load dispersion device 0024 to set this load amount as the set load amount (S0403).

Incidentally, with respect to the value of the set load amount, the following two patterns are present. More specifically, there are pattern 1 in which, as the party number is smaller, the set load amount is made smaller, and pattern 2 in which, as the party number is smaller, the set load value is made larger. The party and load amount management table shown in FIG. 15 corresponds to the pattern 1. A party and load amount management table 0107 of the pattern 2 is shown in FIG. 16.

In the pattern 1, the load amount becomes smaller on the object to be monitored 0010 whose party number is smaller, namely, whose monitoring interval is shorter and whose monitoring intensity is higher. The advantage of this pattern is that the load amount between the parties can be balanced with the load due to the monitoring being taken into consideration. When the monitoring is executed at a short monitoring interval, the load due to the monitoring increases. More specifically, the load amount due to the monitoring varies between the parties. Therefore, the set load amount is accordingly decreased by the difference, and thus, the total load can be equalized between the parties.

In the pattern 2, the load amount becomes larger on the object to be monitored 0010 whose party number is smaller, namely, whose monitoring interval is shorter and whose monitoring intensity is higher. The advantage of this pattern is that the number of load increase events to be notified from the monitoring agent program 0011 to the monitoring manager program 0002 can be suppressed. In this pattern, since the load amount is larger on the object to be monitored 0010 in the party where the monitoring intensity is higher, a possibility that the load increase event occurs is higher than the other parties. More specifically, the load increase can be detected earlier than the other parties.

Figure 18:
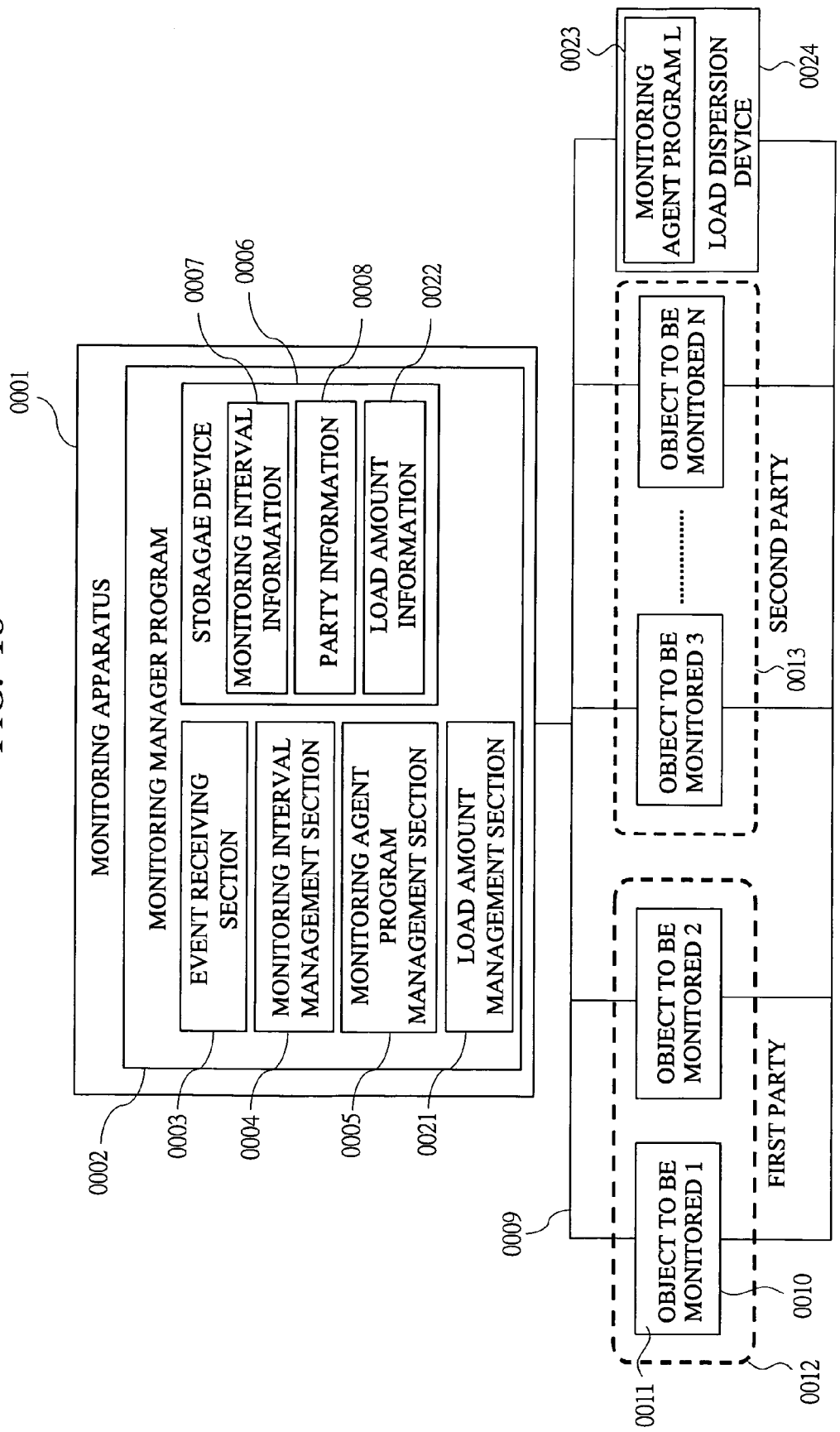
FIG. 18 is a block diagram illustrating the monitoring system according to a fifth embodiment of the present invention.

FIG. 18 is a block diagram illustrating the monitoring system according to the fifth embodiment of the present invention. The monitoring system according to the fifth embodiment has the configuration obtained by adding a monitoring agent program L (0023) which operates on the load dispersion device 0024 to the monitoring system according to the fourth embodiment shown in FIG. 14. The monitoring agent program L takes charge of the monitoring of all the objects to be monitored 1 to N. The monitoring agent program L monitors a state of the distribution of the requests to the objects to be monitored 1 to N by the load dispersion device 0024 in each object to be monitored.

Figure 19:
FIG. 19 is a diagram illustrating the party management table in the monitoring system according to the fifth embodiment of the present invention.

FIG. 19 illustrates a party management table 0108 in the monitoring system according to the fifth embodiment. As shown in FIG. 19, the monitoring agent program L takes charge of the monitoring of all the objects to be monitored 0010.

Figure 20:
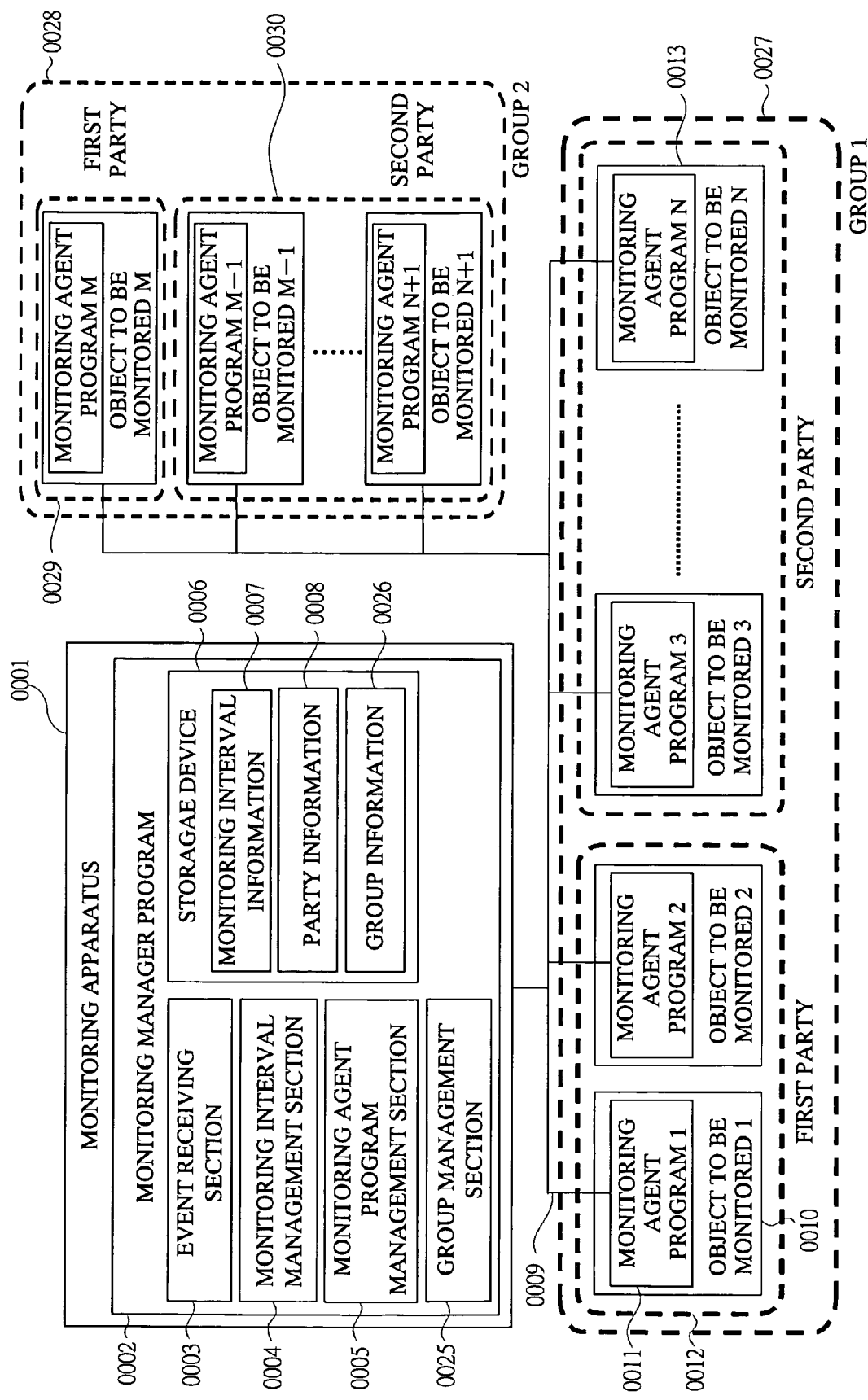
FIG. 20 is a block diagram illustrating the monitoring system according to a sixth embodiment of the present invention.

FIG. 20 is a block diagram illustrating the monitoring system according to the sixth embodiment of the present invention. In the monitoring system according to the sixth embodiment, the objects to be monitored 0010 are divided into a plurality of groups and the management on the basis of the parties are performed in each group.

This monitoring system has the configuration obtained by adding a group management section 0025 and group information 0026 to the monitoring system according to the first embodiment shown in FIG. 1. More specifically, the monitoring manager program 0002 has a function to divide the monitoring agent programs 0011 into a plurality of groups and divide the monitoring agent programs 0011 in the respective groups into respective parties.

The M objects to be monitored 0010 are divided into a group 1 (0027) including the objects to be monitored 1 to N and a group 2 (0028) including the objects to be monitored N+1 to M. The group 1 includes the first party 0012 having the objects to be monitored 1 and 2, and the second party 0013 having the objects to be monitored 3 to N. The group 2 includes a first party 0029 having the object to be monitored M and a second party 0030 having the objects to be monitored N+1 to M−1.

A group table 0109 in the monitoring system is shown in FIG. 21. The group table 0109 stores information of the groups as well as the party information and the monitoring interval information. More specifically, a correlation between the groups and the parties and a correlation between the parties and the monitoring agent programs 0011 are stored.

Figure 22:
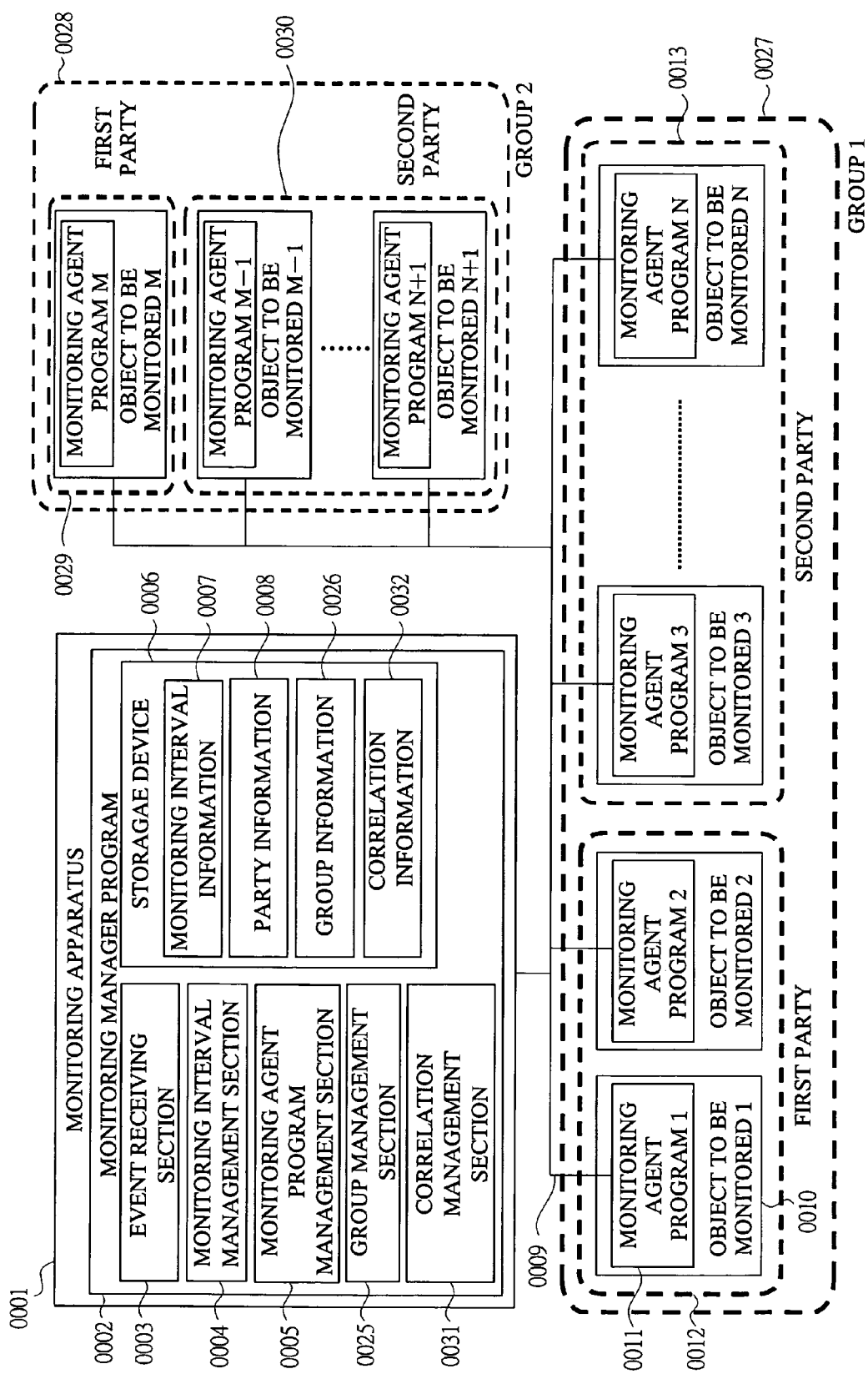
FIG. 22 is a block diagram illustrating the monitoring system according to a seventh embodiment of the present invention.

FIG. 22 is a block diagram illustrating the monitoring system according to the seventh embodiment of the present invention. The monitoring system according to the seventh embodiment has the configuration obtained by adding a function to manage the correlation between the groups to the monitoring system according to the sixth embodiment shown in FIG. 20.

Figure 23:
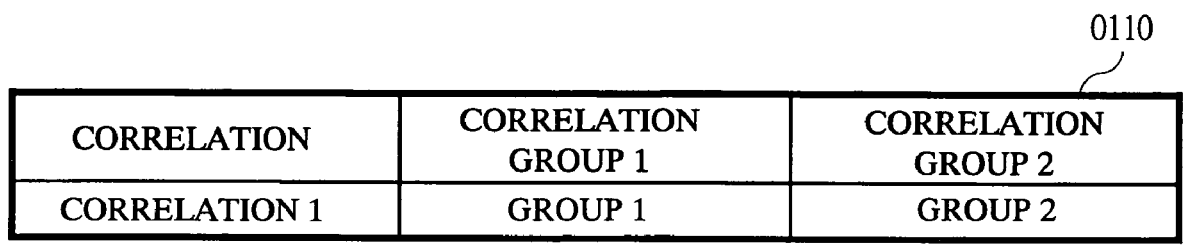
FIG. 23 is a diagram illustrating a correlation table in the monitoring system according to the seventh embodiment of the present invention.

The correlation between the groups is managed by a correlation management section 0031 and correlation information 0032. The correlation information 0032 is represented by, for example, a correlation table 0110 shown in FIG. 23. FIG. 23 shows that the group 1 (0027) is correlated with the group 2 (0028). Concrete contents of the correlation and various process flows using the correlation will be described later.

Figure 24:
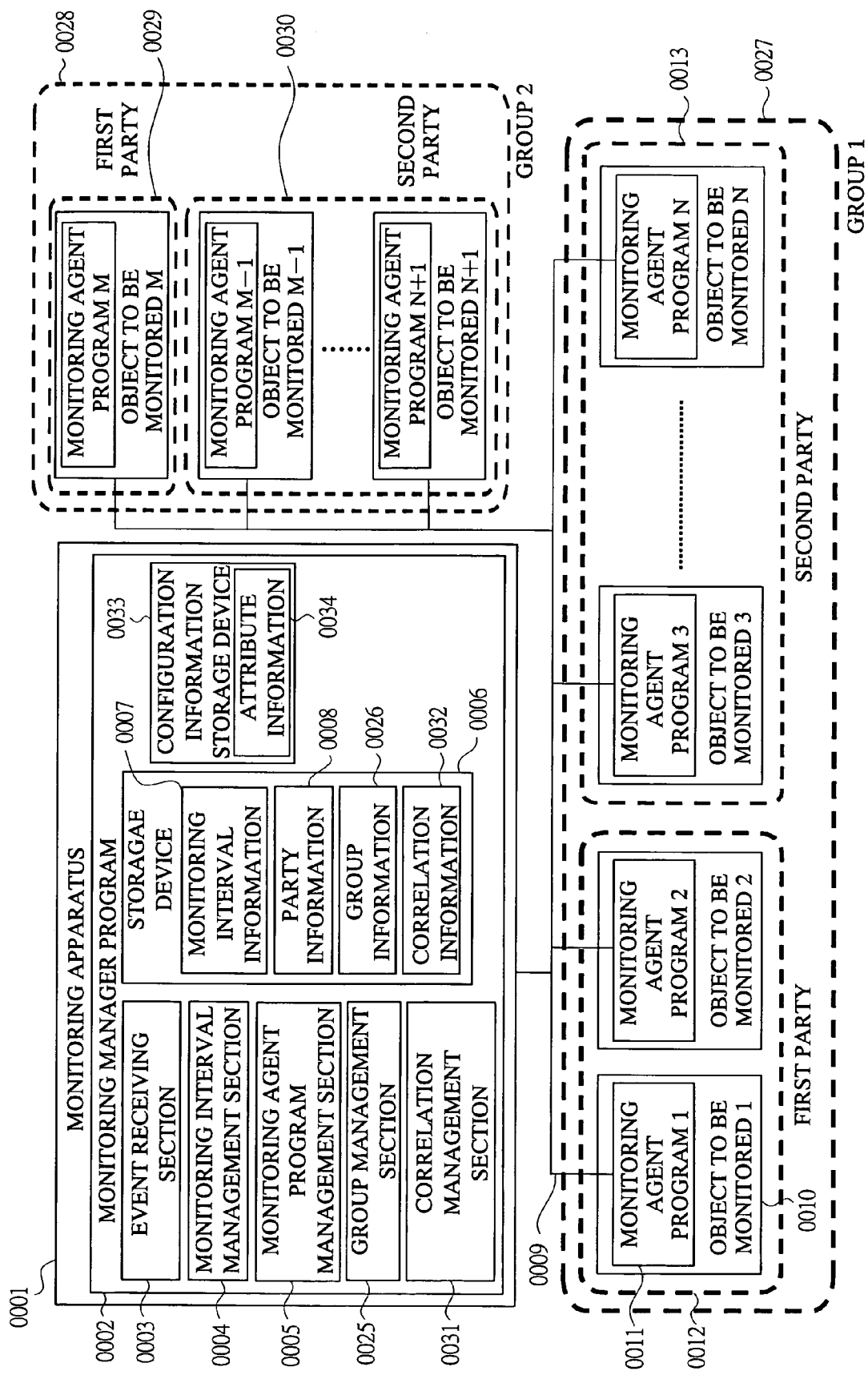
FIG. 24 is a block diagram illustrating the monitoring system according to an eighth embodiment of the present invention.

FIG. 24 is a block diagram illustrating the monitoring system according to the eighth embodiment of the present invention. The monitoring system according to the eighth embodiment has the configuration obtained by adding a configuration information storage device 0033 to the monitoring system according to the seventh embodiment shown in FIG. 22. The configuration information storage device 0033 stores information of the configurations of the objects to be monitored 0010. The information of the configurations of the objects to be monitored 0010 is stored as attribute information 0034 about the objects to be monitored.

Figure 29:
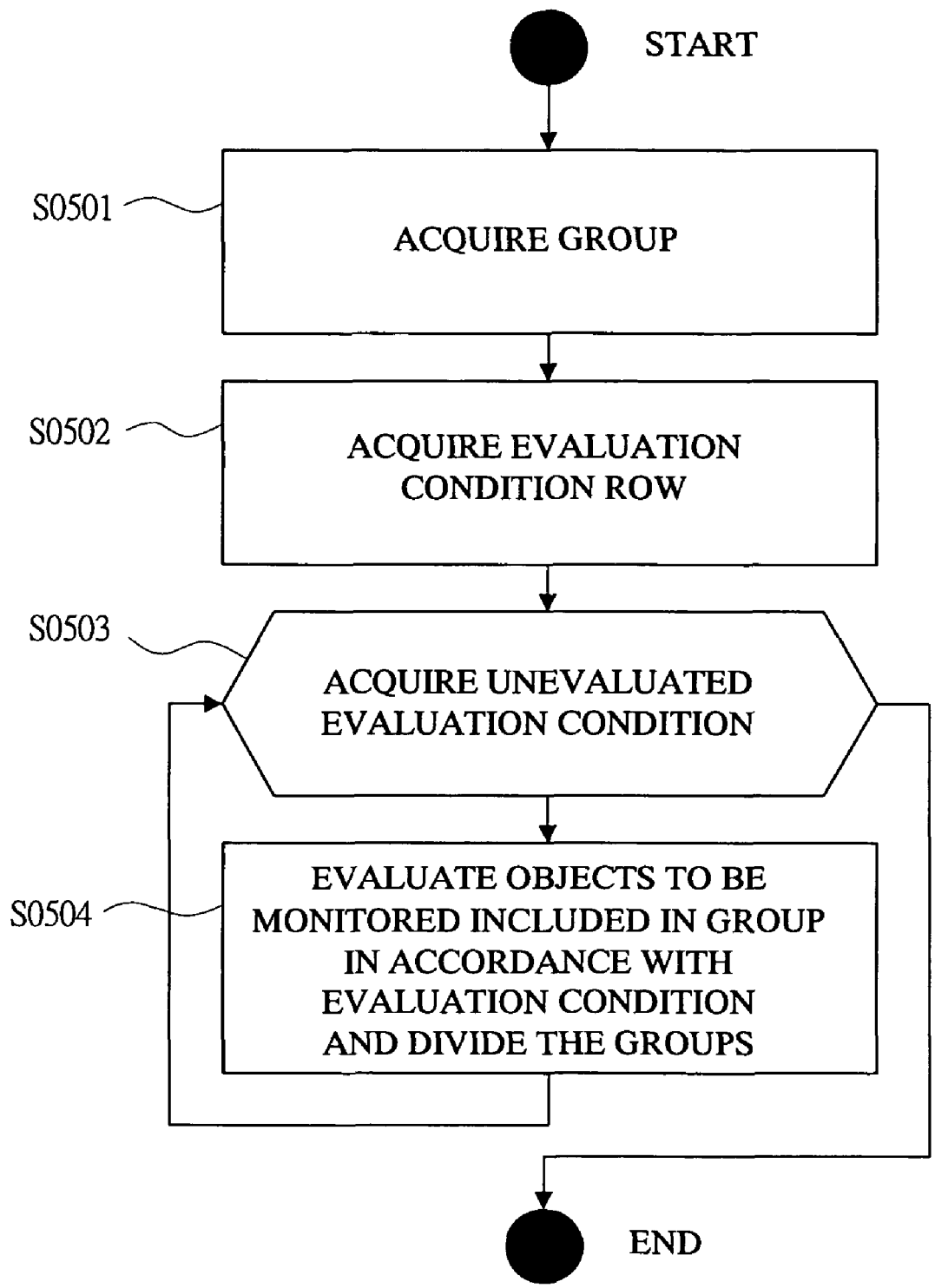
FIG. 29 is a flowchart illustrating a group dividing process in the monitoring system according to the eighth embodiment of the present invention.

FIG. 29 is a flowchart of a group dividing process. In this process, a group including a plurality of the objects to be monitored 0010 and one or more evaluation conditions are inputted and the group is evaluated based on the evaluation conditions so as to divide the group into a plurality of groups.

First, group information of the input group is acquired from the group information 0026 stored in the storage device 0006 (S0501). Subsequently, a row of the input evaluation conditions are acquired (S0502), and an unprocessed evaluation condition is acquired therefrom (S0503). Next, the objects to be monitored in the group are evaluated based on the evaluation condition, and the group is divided into groups each including the objects to be monitored whose evaluation result is the same (S0504). Next, with using the divided groups as new input groups, the step at S0503 is repeated. Finally, the process is ended at the time when the unevaluated evaluation condition is not present.

Figure 25:
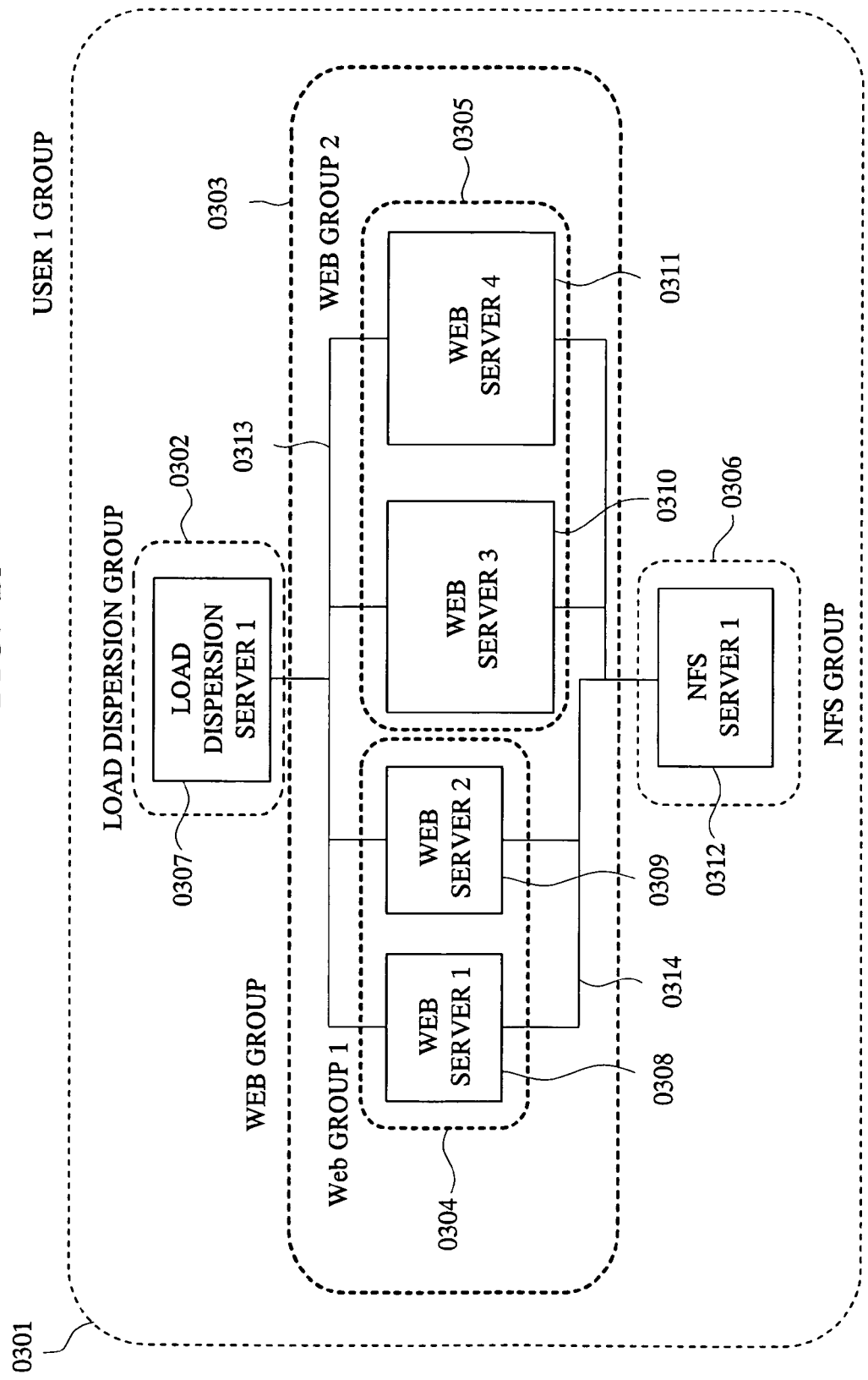
FIG. 25 is a diagram illustrating an example of a group division in the monitoring system according to the eighth embodiment of the present invention.

In order to describe the concrete group division, an example of the system comprised of a plurality of the objects to be monitored 0010 is shown. The configuration of the system in the example of this group division is shown in FIG. 25. This system is comprised of one load dispersion server 1 (0307), four Web servers 1 to 4 (0308 to 0311) and one NFS server 1 (0312), and each of the servers is connected through LAN 1 (0313) and LAN 2 (0314).

The configuration information of the objects to be monitored is stored in an attribute table 0111 shown in FIG. 27. The attribute table 0111 stores attributes of the objects to be monitored and their attribute values. FIG. 27 shows the attributes and the attribute values of the objects to be monitored in the system shown in FIG. 25.

The system shown in FIG. 25 is divided into groups according to the flowchart of the group dividing process shown in FIG. 29. Note that a user of this system is called as "user 1", and the group comprised of all the objects to be monitored in the system is called as a user 1 group 0301.

The user 1 group 0301 is set as the input group into the group dividing process. Further, an evaluation condition 1: "whether the attribute values of the applications match" and an evaluation condition 2: "whether the attribute values of the specifications of the computing machines match" are set as the evaluation condition row.

First, the user 1 group 0301 is divided into groups based on the evaluation condition 1. According to the attribute table 0111 in FIG. 27, attributes of the applications include two attributes: "application name" and "application version". When the objects to be monitored in which these attribute values are the same are collected in a group, the group is divided into three groups, that is: a group including only the load dispersion server; a group including the Web servers 1 to 4; and a group including only the NFS server. Next, these three groups are divided into groups based on the evaluation condition 2. According to the attribute table 0111 in FIG. 27, the attribute of the specification of the computing machine is only "the number of CPUs". Therefore, when the three groups are divided based on the evaluation condition 2, the group including the Web servers 1 to 4 is divided into a group including the Web servers 1 and 2 where the number of CPUs is 1, and a group including the Web servers 3 and 4 where the number of CPUs is 2.

Consequently, the system shown in FIG. 25 is divided into the user 1 group 0301, a load dispersion group 0302, a Web group 0303, a Web group 1 (0304), a Web group 2 (0305) and an NFS group 0306.

Figure 26:
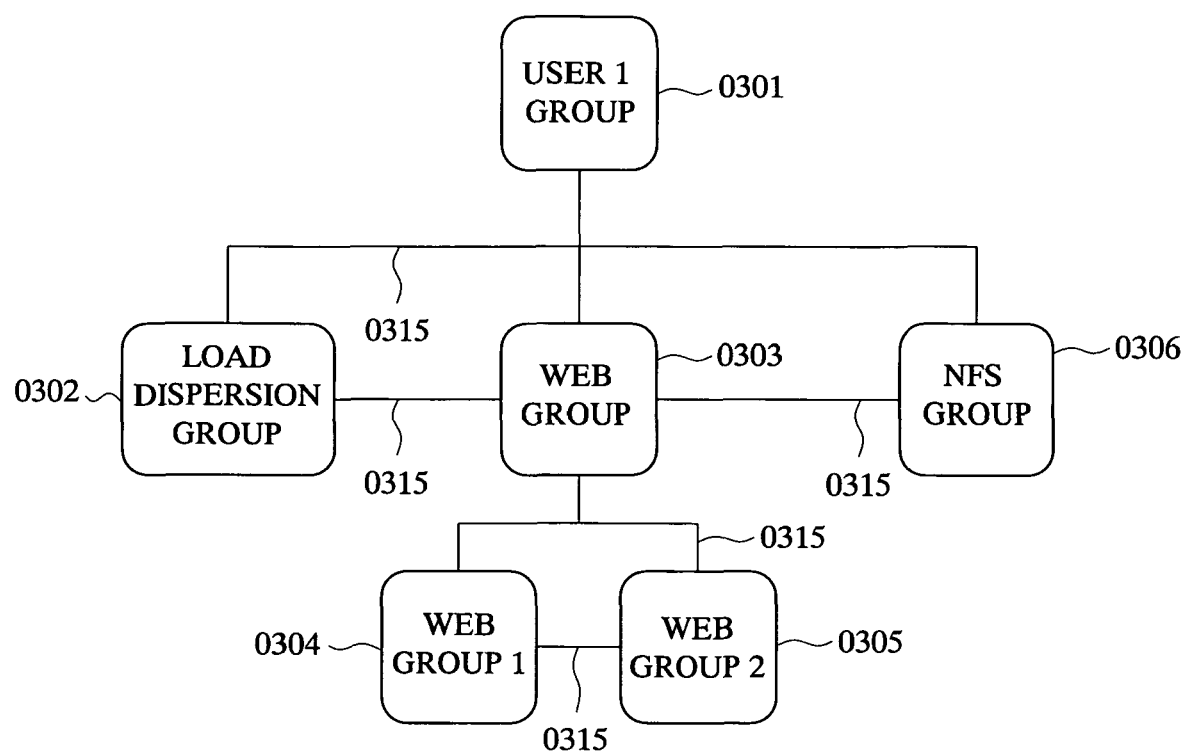
FIG. 26 is a diagram illustrating an example of correlation between the groups in the monitoring system according to the eighth embodiment of the present invention.

When a correlation between the group before the group division and the plural groups obtained by dividing the group is created and a correlation between these groups and the group before the group division are created, the correlation 0315 between the groups is as shown in FIG. 26. In this case, a correlation table 0112 is as shown in FIG. 28.

Figure 30:
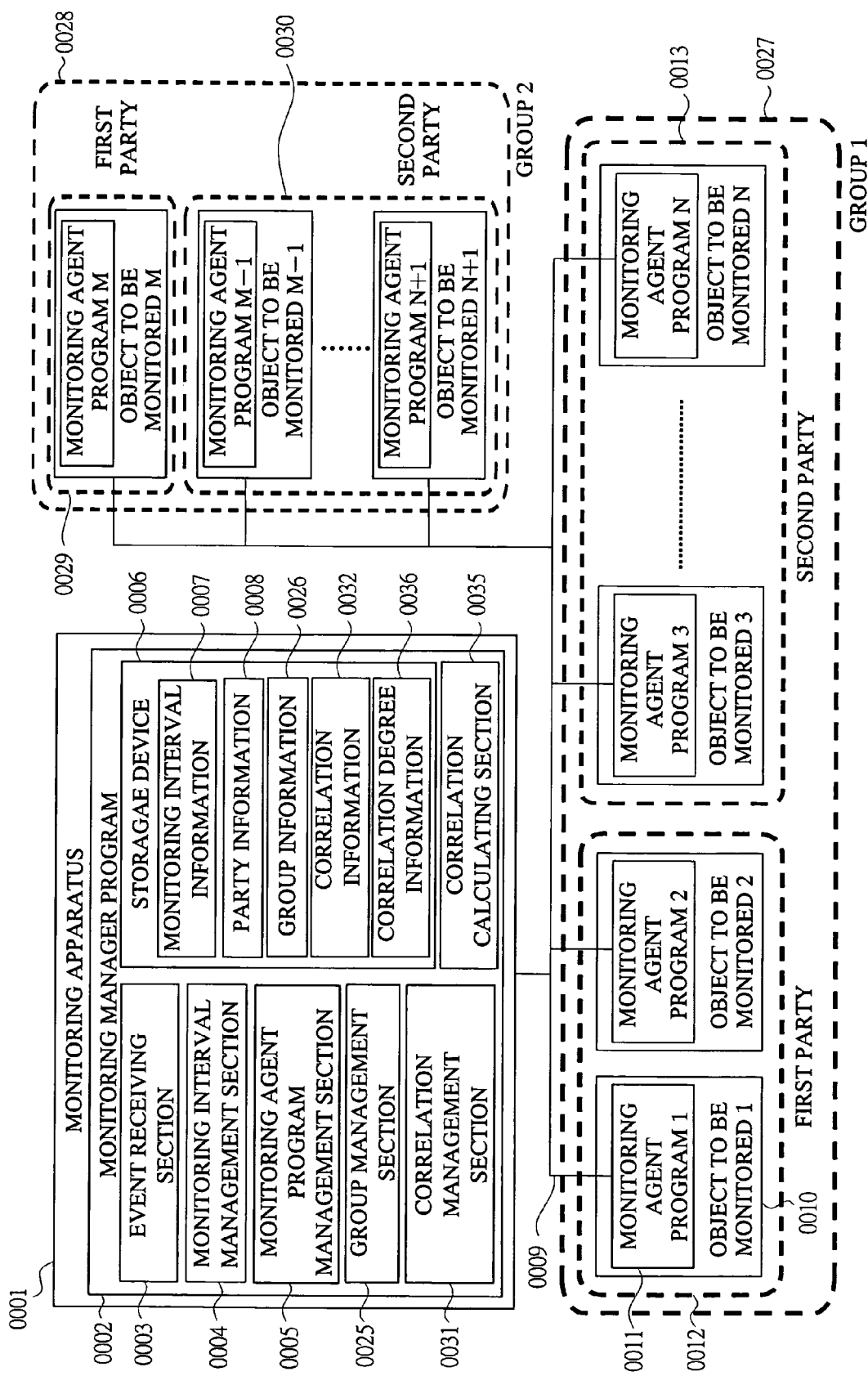
FIG. 30 is a block diagram illustrating the monitoring system according to a ninth embodiment of the present invention.

FIG. 30 is a block diagram illustrating the monitoring system according to the ninth embodiment of the present invention. The monitoring system according to the ninth embodiment has the configuration obtained by adding a function to manage a degree of correlation between the groups to the monitoring system according to the eighth embodiment shown in FIG. 24.

Figures 31, 32:
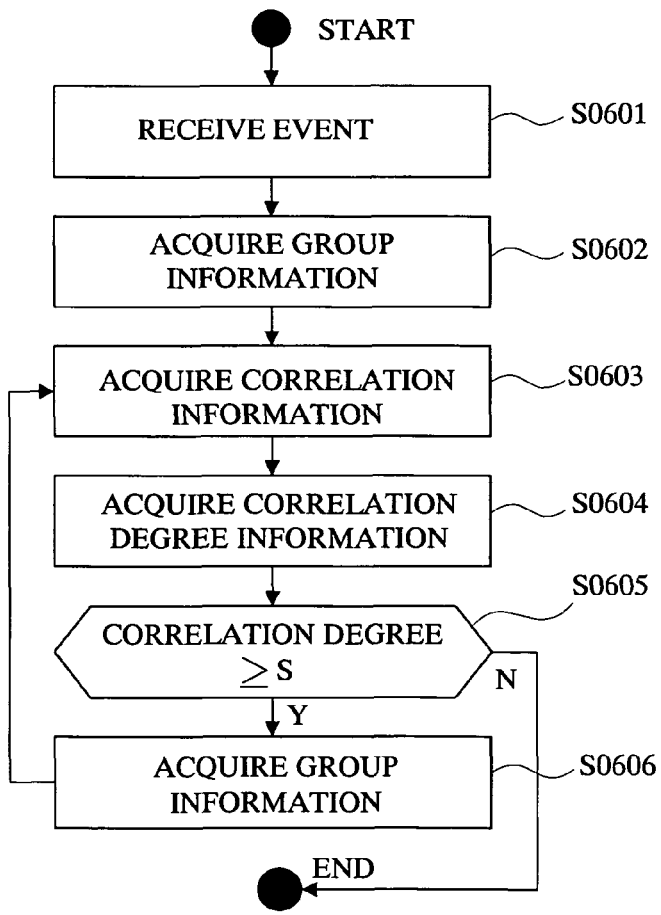
FIG. 31 is a diagram illustrating a correlation table with a degree of correlation in the monitoring system according to the ninth embodiment of the present invention.
FIG. 32 is a flowchart illustrating an event transmitting process based on the degree of correlation in the monitoring system according to the ninth embodiment of the present invention.

The degree of correlation is managed by a correlation calculating section 0035 and correlation degree information 0036. The correlation degree information 0036 stores a degree of correlation between correlated groups. FIG. 31 illustrates a correlation table 0113 with degree of correlation having information of the degree of correlation between the groups. In this table, correlated two groups and the degree of correlation therebetween (70 in FIG. 31) are stored.

Flows of various processes using the correlation degree information will be described below. First, a flow of the process for transmitting an event which occurs in a certain group to the group and a group having a predetermined degree of correlation with the certain group will be described. This flowchart is shown in FIG. 32.

First, the event receiving section 0018 receives the event (S0601). Next, the information of the group where the event occurs is acquired (S0602). Subsequently, the correlation information of this group is acquired (S0603), and then, the correlation degree information attached to the correlation information is acquired (S0604). Thereafter, it is evaluated whether the degree of correlation is S or more (S0605). When the degree of correlation is S or more, the group information is acquired (S0606), and the event is transmitted to the correlated groups. When the degree of correlation is less than S, the event is not transmitted and the process is ended.

Figure 33:
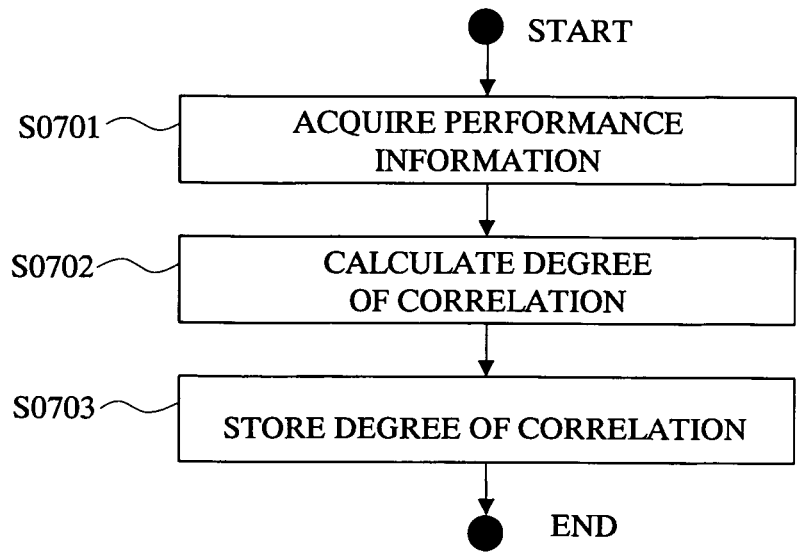
FIG. 33 is a flowchart illustrating a process for updating the degree of correlation in the monitoring system according to the ninth embodiment of the present invention.

FIG. 33 is a flowchart of a process for updating the degree of correlation between two groups. The input is the two groups. First, the performance information is acquired from the monitoring agent programs 0011 in the groups (S0701). Next, with respect to the acquired performance information, the correlation between the groups is analyzed and the degree of the correlation is calculated (S0702). Finally, the calculated degree of correlation is stored in the storage device 0006 (S0703).

Figure 34:
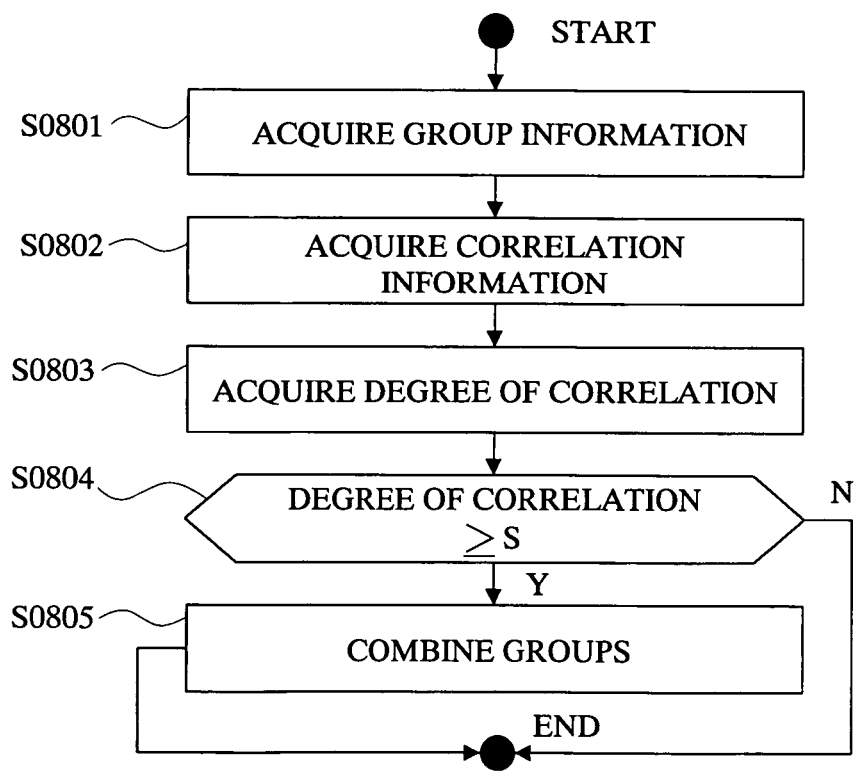
FIG. 34 is a flowchart illustrating a process for combining groups in the monitoring system according to the ninth embodiment of the present invention.

FIG. 34 is a flowchart of a process for combining two groups where the degree of correlation is high. The input is the two groups as candidates to be combined. First, information of the groups is acquired (S0801), and correlation information between the groups is acquired (S0802). Then, a degree of correlation attached to the correlation is acquired (S0803). Next, the acquired degree of correlation is evaluated (S0804), and when the degree of correlation is less than S, the two groups are not combined and the process is ended. When the degree of correlation is S or more, two groups are combined into one group, and the stored contents in the storage device 0006 are changed (S0805).

In the description of the eighth embodiment above, the example where the groups are created with reference to the attribute information 0034 in the configuration information storage device 0033 has been described. Hereinafter, the example where some attribute information 0034 which is different from that in the eight embodiment is shown and groups are created for each attribute will be described. Note that block diagrams illustrating the monitoring system according to respective embodiments described below have the same configuration as that in the eight embodiment, namely, they are the same as the block diagram in FIG. 24, and the flow of the group division follows the flow in FIG. 29.

The tenth embodiment of the present invention will be described. In the tenth embodiment, an attribute table 0201 included in the attribute information 0034 is shown in FIG. 35. In the attribute table 0201 shown in FIG. 35, attribute information of fourteen Web servers (namely, fourteen objects to be monitored 0010) is stored. The names of the servers are described in the attribute "server name". The names of the applications which operate on the servers are described in the attribute "application name". That is, "Web server" is all described therein in this example. The other attributes relate to the specifications of the hardware.

The fourteen Web servers are divided into some groups in accordance with the attribute values relating to the specifications of the hardware. Attributes which are referenced in the group division, namely, the setting of the evaluation condition row are determined by the attributes which influence the processing performance of the Web server. Examples of the evaluation condition row in the following three cases: (1) influence of a CPU performance is great; (2) influence of a memory performance is great; and (3) influence of an HDD performance is great will be described below.

(1) Case where the Influence of the CPU Performance is Great

In the case where a program such as CGI is frequently operated on the Web server, the processing performance of the Web server greatly depends on the CPU performance. For this reason, it is appropriate that the evaluation condition row is comprised of the attributes relating to the CPU performance. An example of the evaluation condition row includes a condition 1: the number of CPUs is equal, a condition 2: the CPU names are the same, and a condition 3: the operating frequencies of the CPUs are equal.

Figure 36:
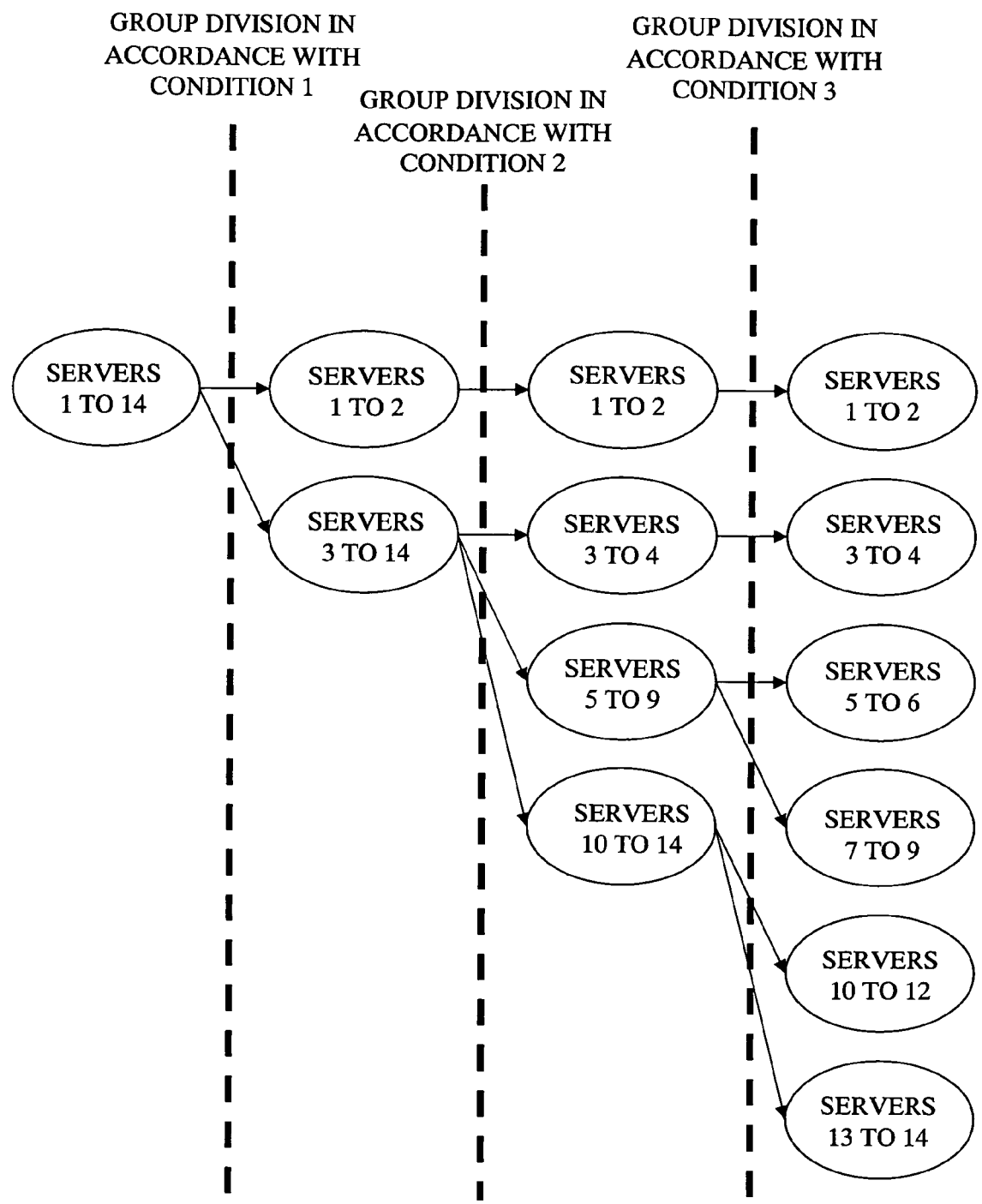
FIG. 36 is a schematic diagram illustrating group division (CPU performance) in the monitoring system according to the tenth embodiment of the present invention.

When the group comprised of the servers 1 to 14 is set as an initial group and the group is divided in accordance with the evaluation condition row described above, the group is divided as shown in FIG. 36. First, the initial group is divided into a group where the number of CPUs is two (servers 1 to 2) and a group where the number of CPUs is one (servers 3 to 14) in accordance with the condition 1. Similarly, when the groups are divided in accordance with the CPU name attribute of the condition 2 and the CPU operating frequency attribute of the condition 3, six groups are finally created.

(2) Case where the Influence of the Memory Performance is Great

In the case where the processing performance of the Web server greatly depends on the memory performance, it is appropriate that the evaluation condition row is comprised of the attributes relating to the memory performance. An example of the evaluation condition row includes a condition 1: secondary cache sizes are equal and a condition 2: memory bus operating frequencies are equal.

Figure 37:
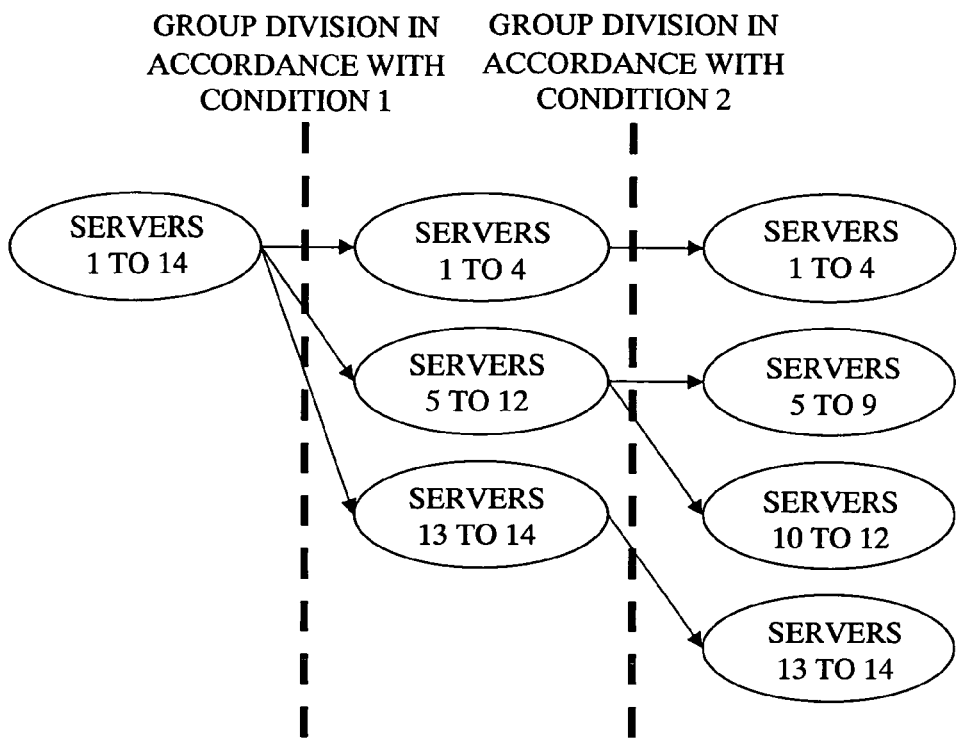
FIG. 37 is a schematic diagram illustrating group division (memory performance) in the monitoring system according to the tenth embodiment of the present invention.

When the group comprised of the server 1 to 14 is set as an initial group and the group is divided in accordance with the evaluation condition row described above, the group is divided as shown in FIG. 37. First, the initial group is divided into a group where the secondary cache size is 2 MB (servers 1 to 4), a group where the secondary cache size is 512 KB (servers 5 to 12), and a group where the secondary cache size is 1 MB (13 to 14) in accordance with the condition 1. Similarly, when the groups are divided in accordance with the memory bus operating frequency attribute of the condition 2, four groups are finally created.

(3) Case where the Influence of the HDD Performance is Great

In the case where the processing performance of the Web server greatly depends on the HDD performance, for example, when a lot of image files with a large size are delivered, it is appropriate that the evaluation condition row is comprised of attributes relating to the HDD performance. An example of the evaluation condition row includes a condition 1: HDD seek time is equal and a condition 2: HDD buffer sizes are equal.

Figure 38:
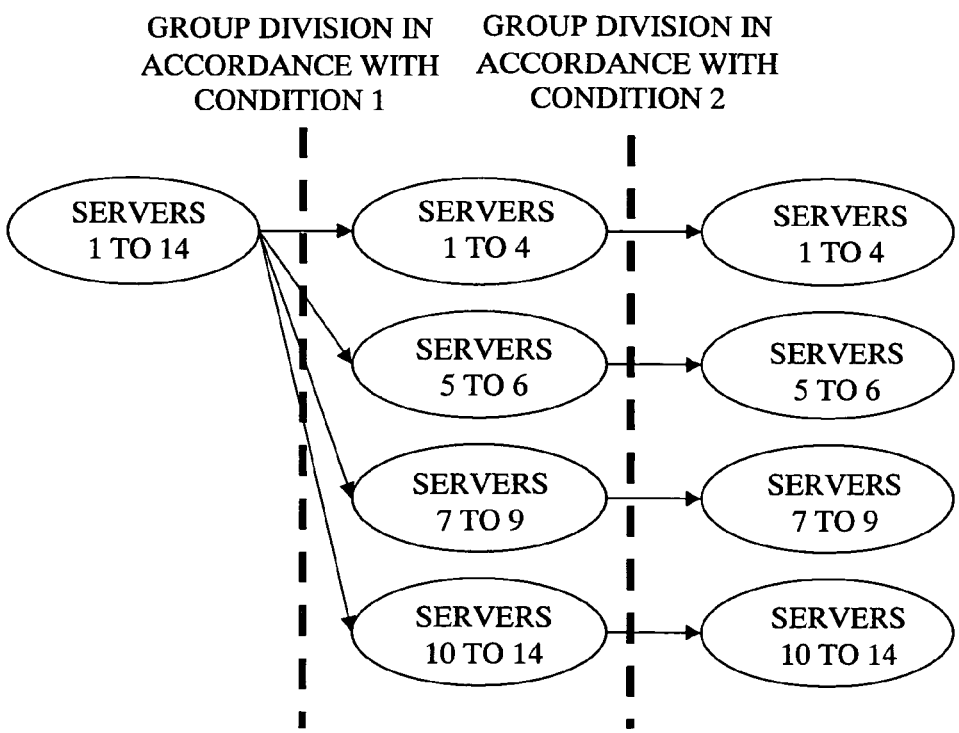
FIG. 38 is a schematic diagram illustrating group division (HDD performance) in the monitoring system according to the tenth embodiment of the present invention.

When the group comprised of the servers 1 to 14 is set as an initial group and the group is divided in accordance with the evaluation condition row described above, the group is divided as shown in FIG. 38. First, the initial group is divided into a group where the HDD seek time is 0.8 ms (servers 1 to 4), a group where the HDD seek time is 1.5 ms (servers 5 to 6), a group where the HDD seek time is 1.2 ms (servers 7 to 9), and a group where the HDD seek time is 1.0 ms (servers 10 to 14) in accordance with the condition 1. Similarly, when the groups are divided in accordance with the HDD buffer size of the condition 2, four groups are finally created.

The eleventh embodiment of the present invention will be described. In the eleventh embodiment, an attribute table 0202 included in the attribute information 0034 is shown in FIG. 39. In the attribute table 0202 shown in FIG. 39, attribute information of six Web servers and eight Java (registered trademark) application servers are stored. Names of the servers are described in the attribute "server name". The names of the applications which operate on the servers are described in the attribute "application name". That is, "Web server" and "Java (registered trademark) application" are all described therein in this example. The attribute "Web cache size" is an attribute only for the Web server and represents a capacity of the cache memory used by the Web servers. The attribute "JVM (Java (registered trademark) Virtual Machine) maximum use memory size" is an attribute only for the Java (registered trademark) application servers and represents a maximum capacity of the memory used by JVM where the Java (registered trademark) application operates.

Since the size of the memory which can be used for both the Web server and Java (registered trademark) application greatly influences the processing performance, it is appropriate that these attributes are included in the evaluation condition row. Examples of the evaluation condition row are shown below.

An example of the evaluation condition row for the Web server includes a condition 1: the names of the applications are the same and a condition 2: the Web cache sizes are equal.

An example of the evaluation condition row for the Java (registered trademark) application servers includes a condition 1: the names of the applications are the same and a condition 3: the JVM maximum use memory sizes are equal.

Figure 40:
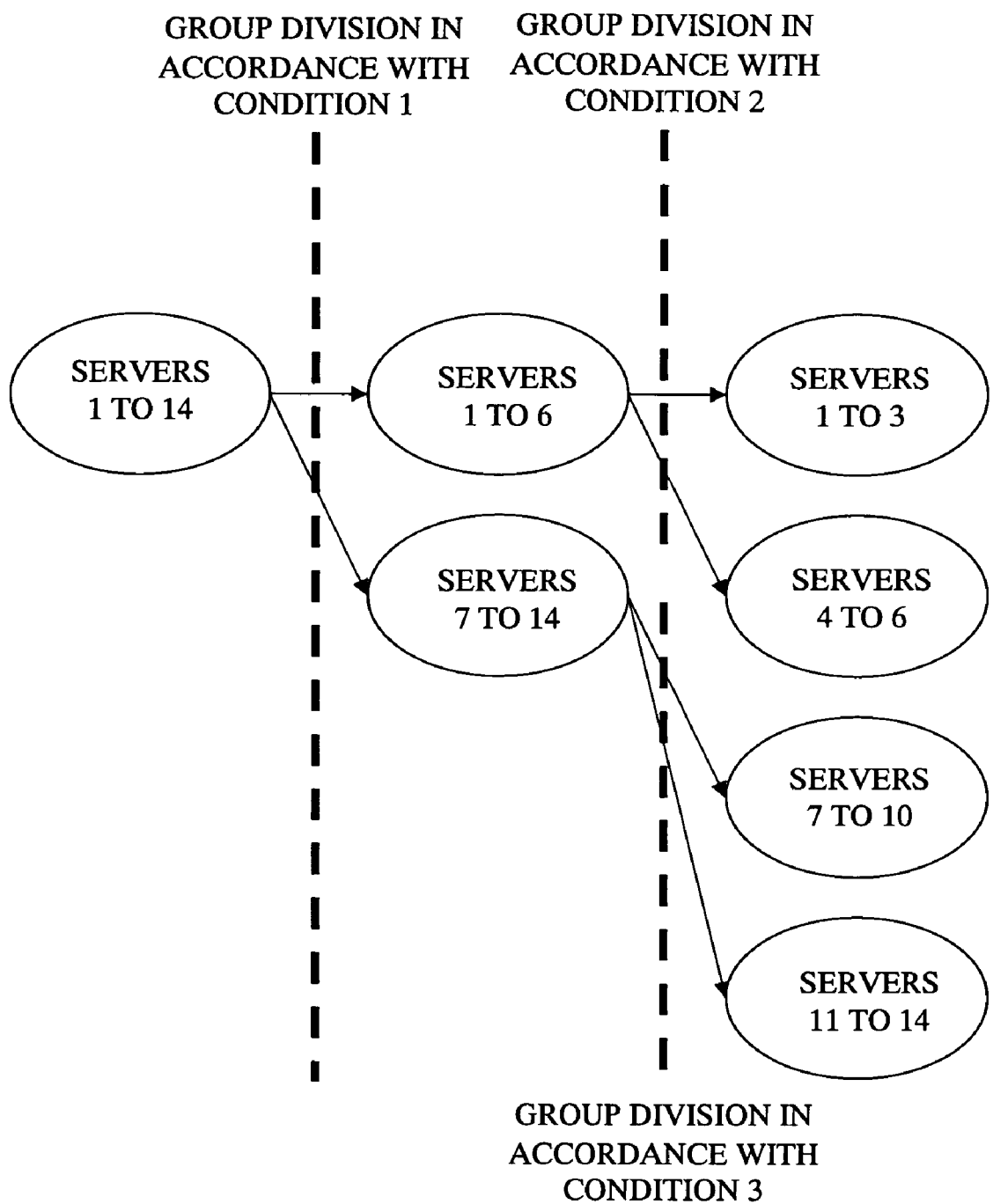
FIG. 40 is a schematic diagram illustrating group division in the monitoring system according to the eleventh embodiment of the present invention.

When the group comprised of the servers 1 to 14 is set as an initial group and the group is divided in accordance with the above-described evaluation condition row, the group is divided as shown in FIG. 40. First, the initial group is divided into a group of the Web server (servers 1 to 6), and a group of the Java (registered trademark) application (servers 7 to 14) in accordance with the condition 1. Next, the group of the Web server is divided into a group where the Web cache size is 1 GB (servers 1 to 3) and a group where the Web cache size is 512 MB (servers 4 to 6) in accordance with the Web cache size attribute of the condition 2. Similarly, the group of the Java (registered trademark) application is divided into a group where the JVM maximum use memory size is 512 MB (servers 7 to 10) and a group where the JVM maximum use memory size is 256 MB (servers 11 to 14) in accordance with the JVM maximum use memory size attribute of the condition 3, and four groups are finally created.

The twelfth embodiment of the present invention will be described. In the twelfth embodiment, an attribute table 0203 included in the attribute information 0034 is shown in FIG. 41. In the attribute table 0203 shown in FIG. 41, attribute information of six servers and fourteen virtual computing machines created on these servers are stored. The hardware specifications of the servers are equivalent. The names of the virtual computing machines are described in the attribute "name of virtual computing machine". The usage rate of the CPUs and the memory usage which can be used by the respective virtual computing machines in the servers are described in the attribute "CPU allocation rate" and the attribute "memory allocation size". More specifically, the performance of the virtual computing machine is defined by these attributes.

Since the performance of the virtual computing machine greatly depends on the above two attributes, it is appropriate that the evaluation condition row for dividing the virtual computing machines into groups includes these attributes. An example of the evaluation condition row includes a condition 1: the CPU allocation rates are equal and a condition 2: memory allocation sizes are equal.

Figure 42:
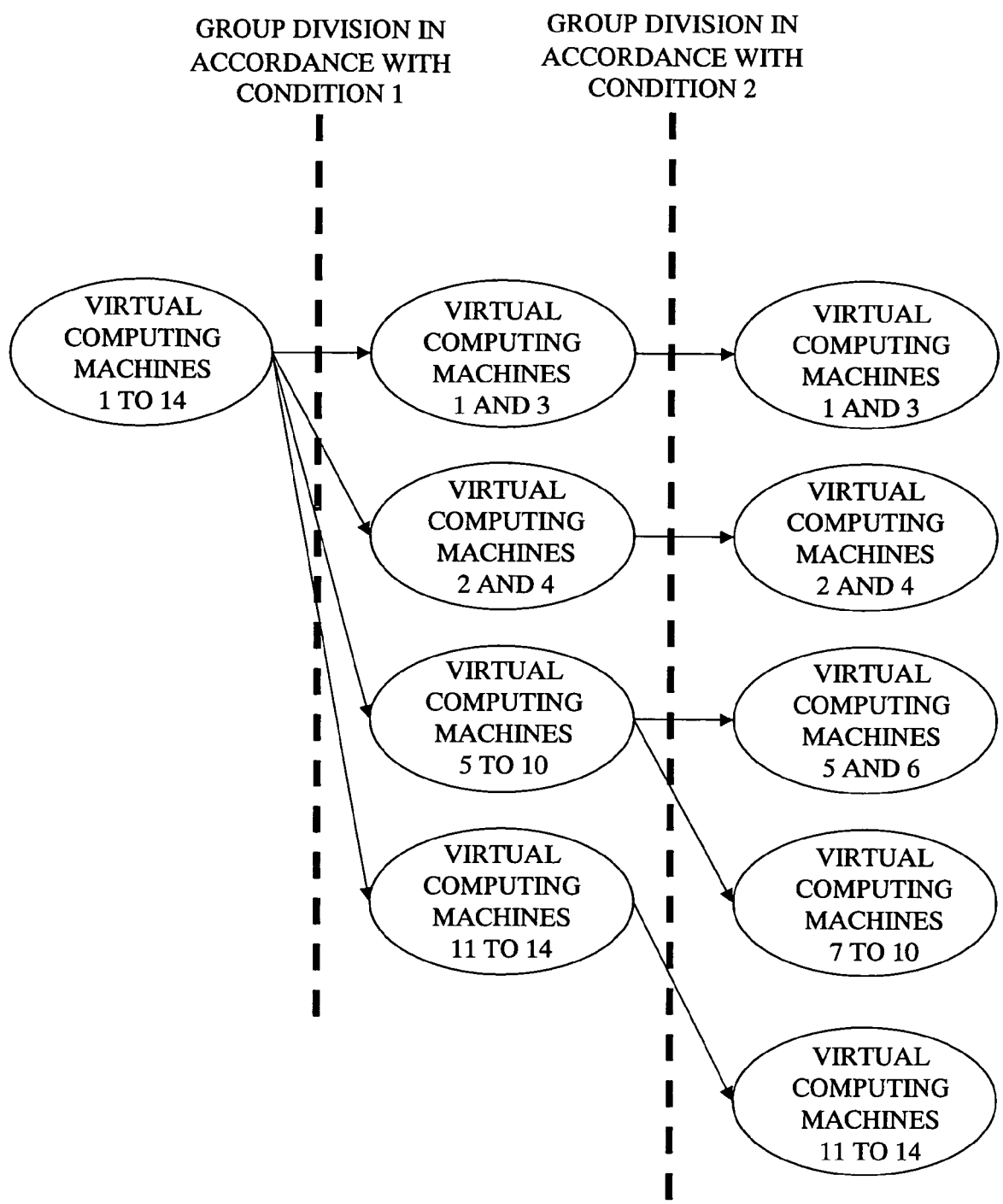
FIG. 42 is a schematic diagram illustrating group division in the monitoring system according to the twelfth embodiment of the present invention.

When the group comprised of the virtual computing machines 1 to 14 is set as an initial group and the group is divided in accordance with the above evaluation condition row, the group is divided as shown in FIG. 42. First, the initial group is divided into a group where the CPU allocation rate is 70% (virtual computing machines 1 and 3), a group where the CPU allocation rate is 30% (virtual computing machines 2 and 4), a group where the CPU allocation rate is 50% (virtual computing machines 5 to 10), and a group where the CPU allocation rate is 25% (virtual computing machines 11 to 14) in accordance with the condition 1. Subsequently, the group where the CPU allocation rate is 50% (virtual computing machines 5 to 10) is divided into a group where the memory allocation size is 512 MB (virtual computing machines 5 to 6) and a group where the memory allocation size is 256 MB (virtual computing machines 7 to 10) in accordance with the condition 2, and five groups are finally created.

Figure 44:
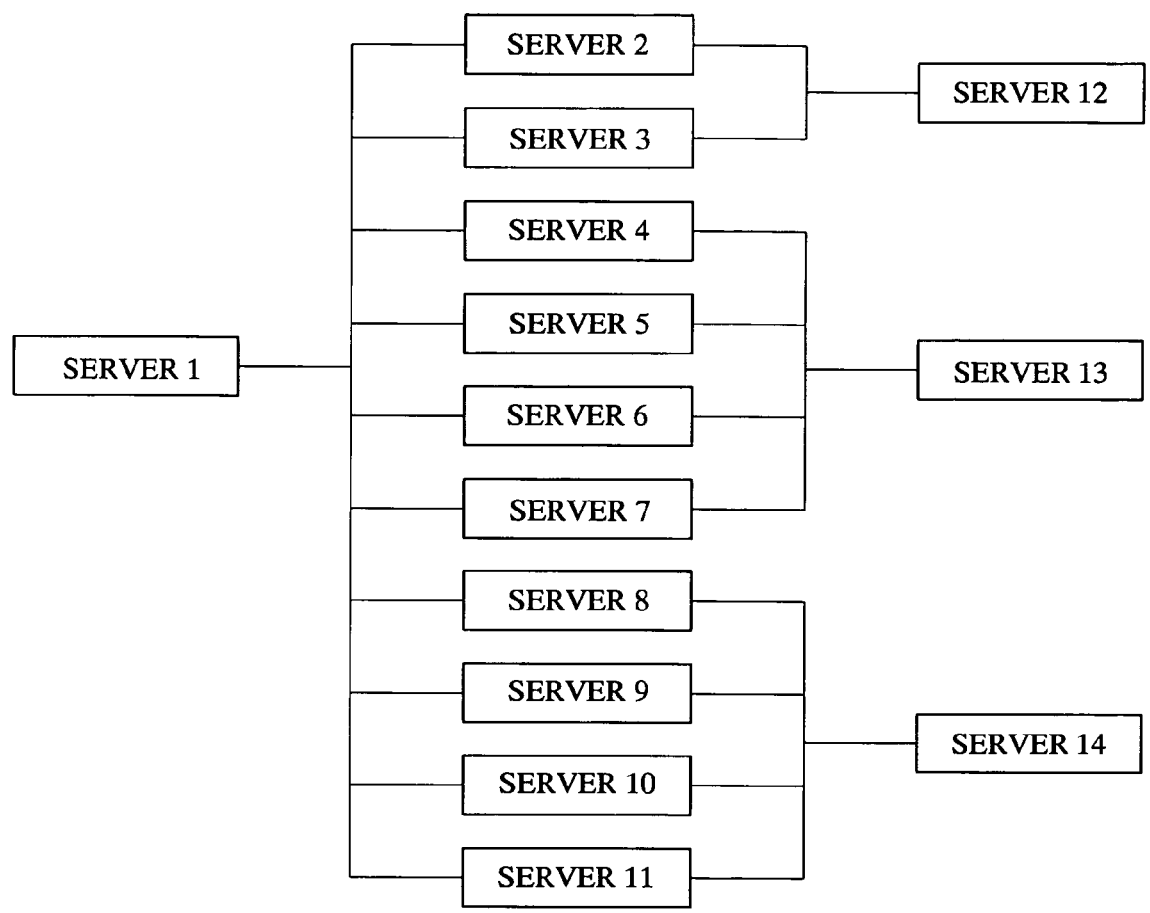
FIG. 44 is a diagram illustrating the system configuration in the monitoring system according to the thirteenth embodiment of the present invention.

The thirteenth embodiment of the present invention will be described. In the thirteenth embodiment, an attribute table 0204 included in the attribute information 0034 is shown in FIG. 43. In the attribute table 0204 shown in FIG. 43, attribute information of one load dispersion server (server 1), ten Web servers (servers 2 to 11) and three NFS servers (servers 12 to 14) are stored. FIG. 44 illustrates the system configuration diagram.

The names of the servers are described in the attribute "server name". The names of the applications operating on the servers are described in the attribute "application name". The attribute "common file destination" is an attribute inherent in the Web server, and the destination of files delivered by the Web servers are described therein. The attribute "provided file type" is an attribute inherent in the NFS server, and the types of files held by the NFS servers are described therein. In this case, the server 12 provides an HTML file, the server 13 provides an image file such as jpeg, png or the like, and the server 14 provides a video file.

These fourteen servers are divided into groups in accordance with an example of the following evaluation condition row, namely, a condition 1: the application names are the same, a condition 2: the common file destination is the same, and a condition 3: the provided file types are the same. Note that the condition 2 is applied only to the Web servers and the condition 3 is applied only to the NFS servers.

Figure 45:
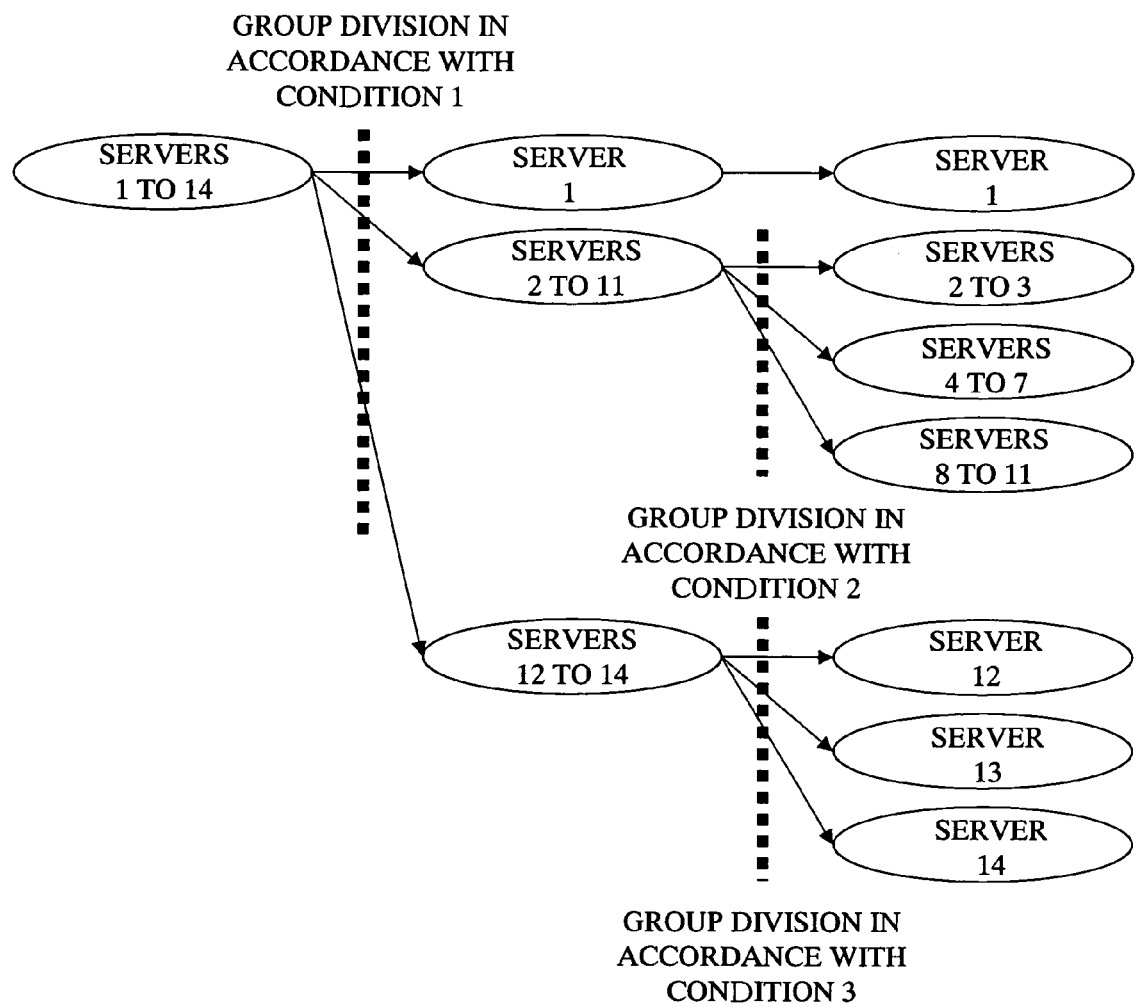
FIG. 45 is a schematic diagram illustrating group division in the monitoring system according to the thirteenth embodiment of the present invention.

When the group comprised of the servers 1 to 14 is set as an initial group and the group is divided in accordance with the above evaluation condition row, the group is divided as shown in FIG. 45. First, the initial group is divided into a group of the load dispersion server (server 1), a group of the Web servers (servers 2 to 11) and a group of the NFS servers (servers 12 to 14) in accordance with the condition 1. Next, the group of the Web servers is divided into a group where the common file destination is the server 12 (servers 2 to 3), a group where the common file destination is the server 13 (servers 4 to 7) and a group where the common file destination is the server 14 (servers 8 to 11) in accordance with the common file destination attribute of the condition 2. Similarly, the group of the NFS servers is divided into a group where the provided file type is an HTML file (server 12), a group where the provided file type is an image file (server 13) and a group where the provided file type is a video file (server 14) in accordance with the provided file type attribute of the condition 3, and seven groups are finally created.

As described above, according to the foregoing embodiments, the cost of the monitoring system can be reduced. More concretely, a plurality of objects to be monitored whose processing performance is similar are divided into a plurality of parties, so that the parties where the monitoring is carried out at a short monitoring interval and the parties where the monitoring is carried out at a long monitoring interval are provided. By doing so, in comparison with the case where all objects to be monitored are monitored at the short monitoring interval, the monitoring cost on the monitoring agent side can be reduced without degrading the monitoring capability. Simultaneously, since the frequency with which information from the monitoring agents is collected on the monitoring manager side is reduced, the monitoring cost can be reduced.

Further, in the case where the objects to be monitored whose processing performance is similar are included in one group and the degree of correlation between the groups relating to the load variation is strong, the change information of the monitoring interval is transmitted between the groups, so that the state of the system can be comprehended quickly.

Further, in the case where the system configuration of the objects to be monitored is changed, the monitoring interval for the objects to be monitored is changed into a short monitoring interval. By doing so, the state of the system after the configuration change can be comprehended quickly.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention is effectively applied to the monitoring system that monitors the performance of the information processing systems and the monitoring method thereof, and is applicable to software products that monitor systems, monitoring apparatuses that monitor systems and others.

What is claimed is:

1. A monitoring system comprising:
   a plurality of information processing apparatuses each having a respective monitoring agent of a plurality of monitoring agents, the respective monitoring agent for each information processing apparatus being implemented for monitoring performance of said information processing apparatus at a predetermined monitoring interval; and
   a monitoring apparatus implementing a monitoring manager for controlling said plurality of monitoring agents,
   wherein said monitoring manager divides said plurality of monitoring agents into groups of monitoring agents for a single service system, each group corresponding to a respective application and including the respective monitoring agent of each information processing apparatus in which the respective application for the group operates in operation of the single service system, and
   wherein said monitoring manager further divides said information processing apparatuses that operate the respective application for each group into a plurality of parties, wherein said monitoring manager obtains performance information for each group from the monitoring agents of the group and analyzes the performance information to calculate a respective degree of correlation for each set of two groups of the groups of monitoring agents, wherein said monitoring manager, for each set of two groups for which the degree of correlation is greater than or equal to a first threshold, transmits event information received from either group of the two groups to the other group of the two groups, and, for each set of two groups for which the degree of correlation is greater than or equal to a second threshold, combines the set of two groups into a single group, said monitoring manager sets each monitoring agent of a first set of a first group of monitoring agents that includes the respective monitoring agents of the information processing apparatuses belonging to a first party of the plurality of parties to monitor the information processing apparatus having the monitoring agent at a first monitoring interval that is shorter than a second monitoring interval, said monitoring manager sets each monitoring agent of a second set of the first group of monitoring agents that includes the respective monitoring agents of the information processing apparatuses belonging to a second party of the plurality of parties to monitor the information processing apparatus having the monitoring agent at the second monitoring interval, said first and second monitoring intervals are stored in a storage device, each monitoring agent of the first set of monitoring agent monitors the information processing apparatus having the monitoring agent at the first monitoring interval, and each monitoring agent of the second set of monitoring agents monitors the information processing apparatus having the monitoring agent at the second monitoring interval.

2. The monitoring system according to claim 1, wherein said monitoring manager exchanges the monitoring agents included in each of the parties between the parties.

3. The monitoring system according to claim 1, wherein said monitoring agents notify an event to said monitoring manager when information acquired by monitoring objects to be monitored satisfies a predetermined condition, and said monitoring manager analyzes contents of the event and calculates a number of the monitoring agents included in said respective parties and the monitoring interval at which the monitoring agents in the respective parties monitor the objects to be monitored, and a function to instruct said monitoring agents to change the monitoring interval as a result of the calculation.

4. The monitoring system according to claim 3, wherein said monitoring agents acquire information by monitoring the objects to be monitored at a first interval, determine whether information acquired at a second interval satisfies a predetermined condition, and notify an event to said monitoring manager when it satisfies the condition, and said monitoring manager analyzes contents of the event and calculates the number of the monitoring agents included in said respective parties and said first interval and said second interval of the monitoring agents in the respective parties, and instructs said monitoring agents to change the monitoring interval as a result of the calculation.

5. The monitoring system according to claim 3, wherein said monitoring manager receives an event in which configuration of a first object to be monitored is changed and shortens the monitoring interval as calculated after receiving the event.

6. The monitoring system according to claim 1, wherein said monitoring manager receives a trouble as a trouble event when a trouble occurs in a first object to be monitored, and the monitoring manager automatically shifts a monitoring interval of said monitoring agents included in the second set from the second monitoring interval belonging to the same group into the first monitoring interval after said trouble event is received and when the monitoring agent corresponding to said trouble event is included in the first set.

7. The monitoring system according to claim 1, wherein said monitoring manager sets a load amount on objects to be monitored which are monitored by said monitoring agents, and the load amount on the objects to be monitored which are monitored by the respective monitoring agents for each information processing apparatus included in each party is set in the party.

8. The monitoring system according to claim 1, further comprising:

a configuration information storage device which stores configuration information of objects to be monitored, wherein said monitoring manager acquires the configuration information of each object to be monitored from said configuration information storage device, evaluates said configuration information in accordance with a predetermined evaluation condition, and combines the monitoring agents monitoring the objects to be monitored whose evaluation results match with one another or fall within a predetermined range into one group.

9. The monitoring system according to claim 8, wherein groups are created using a condition for evaluating identity of specification information of the objects to be monitored as said performance evaluation condition.

10. The monitoring system according to claim 8, wherein groups are created using a condition for evaluating identity of applications of the objects to be monitored as the performance evaluation condition.

11. The monitoring system according to claim 8, wherein said configuration information storage device stores correlation information defining a correlation for each set of two groups of the groups of monitoring agents and stores the respective degree of correlation calculated for each set of two groups of the groups of monitoring agents representing correlativity among the groups correlated by said correlation for each of said correlations.

12. The monitoring system according to claim 11, wherein said monitoring agent have performance information storage devices which respectively store the performance information for each group obtained from the monitoring agents of the group, and said monitoring manager calculates correlativity of performance information of the objects to be monitored included in the groups correlated by said correlation in accordance with a predetermined schedule, and stores a calculated correlativity result as obtained in said degree of correlation.

13. The monitoring system according to claim 12, wherein, when the calculated correlativity result satisfies a predetermined condition, said correlated groups are combined to one group.

14. A monitoring method in a monitoring system which comprises a plurality of information processing apparatuses and a monitoring apparatus, comprising:

storing each monitoring agent of a plurality of monitoring agents in a corresponding information processing apparatus of the plurality of information processing apparatuses, the corresponding monitoring agent being stored in each information processing apparatus being implemented for monitoring said corresponding information processing apparatus as an object to be monitored at a predetermined monitoring interval;

implementing a monitoring manager in the monitoring apparatus for controlling said plurality of monitoring agents;

dividing by the monitoring manager the plurality of monitoring agents into groups of monitoring agents for a single service system, each group corresponding to a respective application and including the corresponding monitoring agent of each information processing apparatus in which the respective application for the group operates in operation of the single service system;

further dividing by the monitoring manager th monitoring agents of each group into a plurality of parties;

obtaining, by the monitoring manager, performance information for each group from the monitoring agents of the group;

analyzing, by the monitoring manager, the performance information to calculate a respective degree of correlation for each set of two groups of the groups of monitoring agents;

for each set of two groups for which the degree of correlation is greater than or equal to a first threshold, transmitting, by the monitoring manager, event information received from either group of the two groups to the other group of the two groups;

for each set of two groups for which the degree of correlation is greater than or equal to a second threshold, combining, by the monitoring manager, the set of two groups into a single group;

setting by the monitoring manager each monitoring agent of a first set of a first group of monitoring agents that includes the monitoring agents belonging to a first party of the plurality of parties to monitor the corresponding information processing apparatus for the monitoring agent at a first monitoring interval that is shorter than a second monitoring interval; and setting by the monitoring manager each monitoring agent of a second set of the first group of monitoring agents that includes the monitoring agents belonging to a second party of the plurality of parties to monitor the corresponding information processing apparatus for the monitoring agent at a first monitoring interval that is shorter than a second monitoring interval.

15. The monitoring method according to claim 14, wherein each monitoring agents of the first set of monitoring agents monitors the corresponding information processing apparatus at the first interval to acquire information, determines whether information acquired at the second interval satisfies a predetermined condition, and notifies an event to said monitoring manager program when it the predetermined condition is satisfied, and said monitoring manager analyzes contents of the event, calculates a number of the monitoring agents included in said respective parties and said first interval and said second interval of the monitoring agents in the respective parties, and instructs said monitoring agents to change the monitoring interval as a result of the calculation.

16. The monitoring method according to claim 14, wherein configuration information of each of said information processing apparatuses is acquired from a configuration information storage device, said configuration information is evaluated in accordance with a predetermined evaluation condition, and the monitoring agents corresponding to the information processing apparatuses whose evaluation results match with each other or fall within a predetermined range are combined into one group.

17. The monitoring method according to claim 16, wherein groups are created using a condition for evaluating identity of specification information of the information processing apparatuses as said performance evaluation condition.

* * * * *